(12) United States Patent
Hah et al.

(10) Patent No.: US 10,853,034 B2
(45) Date of Patent: Dec. 1, 2020

(54) COMMON FACTOR MASS MULTIPLICATION CIRCUITRY

(71) Applicant: Intel Corporation, Santa Clara, CA (US)

(72) Inventors: Thiam Khean Hah, Milpitas, CA (US); Jason Gee Hock Ong, Santa Clara, CA (US); Yeong Tat Liew, Santa Clara, CA (US); Carl Ebeling, Redwood City, CA (US); Vamsi Nalluri, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 16/147,084

(22) Filed: Sep. 28, 2018

(65) Prior Publication Data
US 2019/0303103 A1 Oct. 3, 2019

Related U.S. Application Data

(63) Continuation-in-part of application No. 15/942,091, filed on Mar. 30, 2018.

(51) Int. Cl.
 *G06F 7/523* (2006.01)
(52) U.S. Cl.
 CPC .................................. *G06F 7/523* (2013.01)
(58) Field of Classification Search
 CPC .......... G06F 7/443; G06F 7/463; G06F 7/465; G06F 7/4876; G06F 7/525338;
 (Continued)

(56) References Cited

U.S. PATENT DOCUMENTS

| | | |
|---|---|---|
| 3,978,329 A | 8/1976 | Baugh et al. |
| 5,146,543 A | 9/1992 | Vassiliadis et al. |

(Continued)

OTHER PUBLICATIONS

Merriam Webster Dictionary, https://www.merriam-webseter.com/dictionary/its., 2017 screenshot of Wayback Archive (Year: 2017).*

(Continued)

*Primary Examiner* — Andrew Caldwell
*Assistant Examiner* — Emily E Larocque
(74) *Attorney, Agent, or Firm* — Treyz Law Group, P.C.; Jason Tsai

(57) ABSTRACT

An integrated circuit that includes common factor mass multiplier (CFMM) circuitry is provided that multiplies a common factor operand by a large number of multiplier operands. The CFMM circuitry may be implemented as an instance specific version or a non-instance specific version. The instance specific version might also be fully enumerated so that the hardware doesn't have to be redesigned assuming all possible unique multiplier values are implemented. Either version can be formed on a programmable integrated circuit or an application-specific integrated circuit. CFMM circuitry configured in this way can be used to support convolution neural networks or any operation that requires a straight common factor multiply. Any adder component with the CFMM circuitry may be implemented using bit-serial adders. The bit-serial adders may be further connected in a tree in CNN applications to sum together many input streams.

21 Claims, 19 Drawing Sheets

(58) Field of Classification Search
CPC ............ G06N 3/04; G06N 3/06; G06N 3/063; H03K 19/17724
USPC ........................................................ 708/627
See application file for complete search history.

(56) References Cited

U.S. PATENT DOCUMENTS

| | | | |
|---|---|---|---|
| 5,208,900 A | | 5/1993 | Gardner |
| 5,255,216 A | * | 10/1993 | Blanz .................... G06F 7/5324 708/620 |
| 5,325,464 A | | 6/1994 | Pechanek et al. |
| 5,337,395 A | | 8/1994 | Vassiliadis et al. |
| 5,355,436 A | | 10/1994 | Shin et al. |
| 5,617,512 A | | 4/1997 | Pechanek et al. |
| 5,808,917 A | | 9/1998 | Chatterjee et al. |
| 6,035,319 A | | 3/2000 | Jong et al. |
| 6,101,522 A | * | 8/2000 | Sato ........................ G06F 7/523 708/603 |
| 7,734,673 B2 | | 6/2010 | Lonn |
| 2003/0195913 A1 | * | 10/2003 | Murphy ................ G06F 7/5334 708/620 |
| 2004/0015459 A1 | | 1/2004 | Jaeger |
| 2017/0250932 A1 | | 8/2017 | Tee et al. |
| 2018/0032859 A1 | * | 2/2018 | Park ...................... G06N 3/0454 |
| 2018/0253402 A1 | * | 9/2018 | Redfern ................. G06N 3/063 |

OTHER PUBLICATIONS

R. Hartley et al., Digit-Serial Computation, Kluwer Academic Publishers, Ch 1, 1995 (Year: 1995).*
J. Wawrzynek CS61c: State Elements: Circuits that Remember, UCB, 2007 (Year: 2007).*
Hah et al., U.S. Appl. No. 15/942,091, filed Mar. 30, 2018.

* cited by examiner

COMMON FACTOR MASS MULTIPLICATION CIRCUITRY

This application is a continuation-in-part of patent application Ser. No. 15/942,091, filed Mar. 30, 2018, which is hereby incorporated by reference herein in its entirety. This application claims the benefit of and claims priority to patent application Ser. No. 15/942,091, filed Mar. 30, 2018.

BACKGROUND

This relates generally to electronic circuitry and, in particular, to circuitry that performs multiplication.

This may include expressions of their equivalents in various forms, such as, but not limited to, an implementation as an integrated circuit, implemented as part of or configured onto programmable logic devices, and functionally mapped onto arrays of processing elements.

Logic circuits are often used to carry out a large number of multiplication operations. As an example, a programmable logic device typically includes blocks with hardwired implementations of arithmetic functions, such as multiplication.

Conventional techniques for optimizing group multiplications typically focus on the implementation efficiency of individual multiply blocks such a Booth multiplier or a Wallace multiplier Other techniques focus on mathematical manipulations such as the Winograd transformation to reduce the total number of multiplications. Many techniques, however, do not amortize the implementation cost across large sets of multiplications with, a common operand.

It is within this context that the embodiments described herein arise.

DETAILED DESCRIPTION

The present embodiments relate to an arrangement of circuits that includes common factor mass multiplication (CFMM) circuitry. The CFMM circuitry is designed to multiply a common factor with two or more multipliers and to amortize the implementation of the common factor multiplication operation across those multiplications to improve one or more design metrics. These metrics may include but are not limited to power, area, cost, performance, and utilization of resources. Examples of resources, may include, but are not limited to Phase Locked Loops (PLL), and look up tables (LUT) on a programmable logic device.

Embodiments of CFMM circuitry may be either instance specific or non-instance specific. Instance specific embodiments is defined as a circuit arrangement that requires the hardware to be redesigned whenever the value of the multipliers changes. A non-instance specific version is defined as a circuit arrangement that can work with arbitrary multipliers without changing the hardware. Both the instance specific, and non-instance specific embodiments can be implemented on a programmable platform/system, or a non-programmable platform/system. An implementation on a programmable platform may include, a configuration on a programmable logic device (PLD), or a functional mapping on to an array of arithmetic processing units. An implementation on a non-programmable platform may include an application-specific integrated circuit (ASIC) or a custom circuit design.

In one suitable hybrid configuration, part of the CFMM circuitry may be instance specific whereas another part of the CFMM circuitry may be non-instance specific. In another suitable hybrid configuration, part of a multiplier may be implemented using CFMM specific techniques, whereas another part of the multiplier may use other techniques. In yet another suitable hybrid configuration, part of the CFMM circuitry may be implemented using programmable logic circuitry whereas another part of the CFMM circuitry may be implemented using non-programmable hardware.

As an example, the CFMM circuitry may be used to implement a convolution neural network (CNN) that has been reformulated to expose common factors. As another example, the CFMM circuitry may be used to implement a direct common factor multiplication or matrix multiplication.

It will be recognized by one skilled in the art, that the present exemplary embodiments may be practiced without some or all of these specific details. In other instances, well-known operations have not been described in detail in order not to unnecessarily obscure the present embodiments.

Figure 1A:
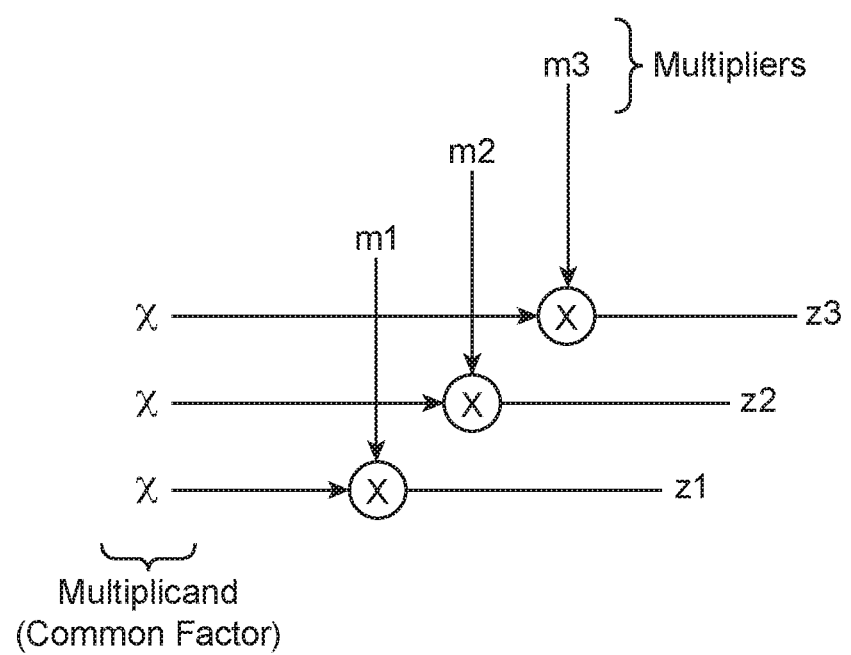
FIG. 1A is a diagram showing the independent multiplication of a common multiplicand with several multipliers

FIG. 1A is a diagram illustrating a set of three multiplications where one operand, X is the same and the second operand, m1, m2, and m3 may be different for each multiplication. Input operand X is therefore a common factor for the products of all three multiplications. The multiplication operation may compute a first product $z1=x*m1$, a second product $z2=x*m2$, and a third product $z3=x*m3$. The diagram illustrating three multiplications in the diagram is an example. The disclosure is applicable to any set of two or more multiplications with one or more common factors on one or both operands.

The operands may also be manipulated in various ways such as, but not limited to, swapping, rearranging and further factoring to create more common factors and/or common factors that are shared among more multiplication and/or change the range of values that the multipliers may have. An example of such manipulation may include input-centric reformulation of CNNs.

Figure 1B:
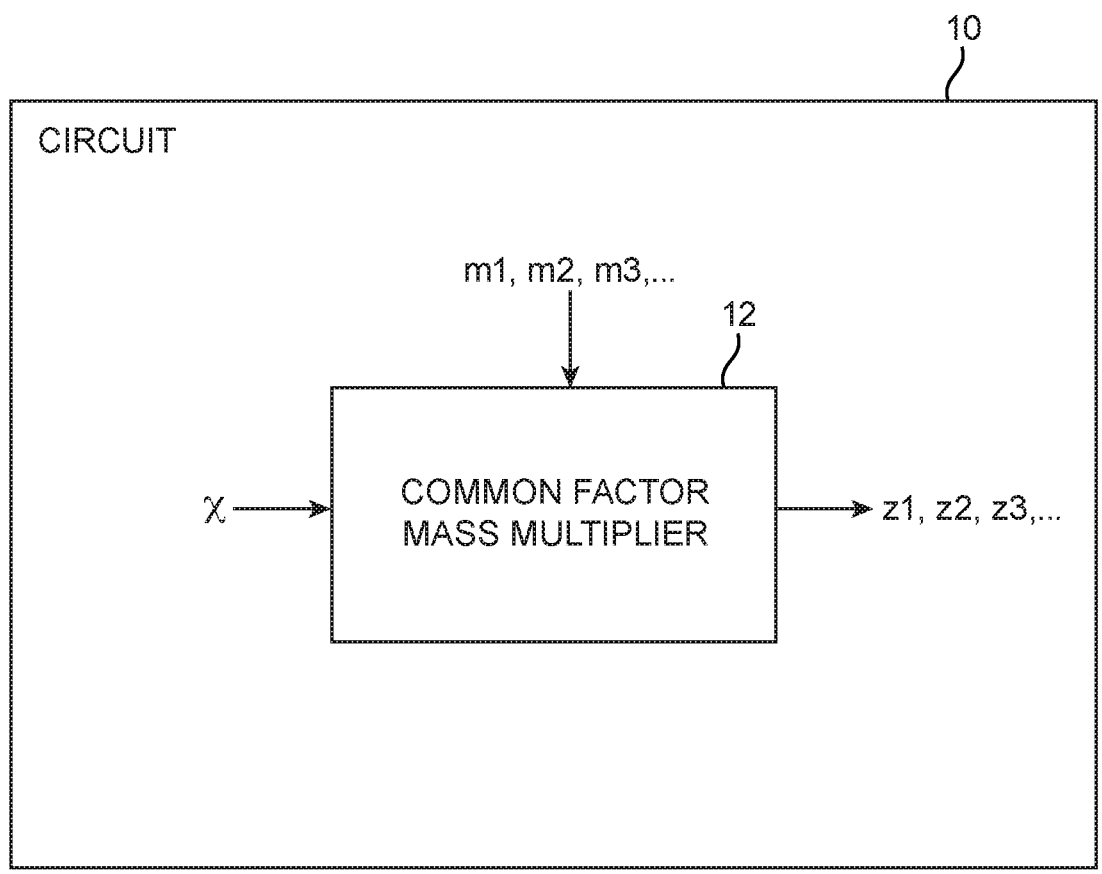
FIG. 1B is a diagram of an illustrative circuit having a common factor mass multiplier (CFMM) in accordance with an embodiment.

FIG. 1B is a diagram of an illustrative circuitry such as circuit 10 that includes a common factor mass multiplier (CFMM) 12. In general, circuit 10 may be one or more of a group of any type of devices, such as programmable logic devices, application specific standard products (ASSPs), application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs). CFMM circuit 12 may be used to implement the function illustrated in FIG. 1A. When using CFMM circuit 12 to implement the function of FIG. 1A, the implementation of the independent multipliers may be co-optimized within circuit 12 and their implementation costs will be amortized.

Figure 2:
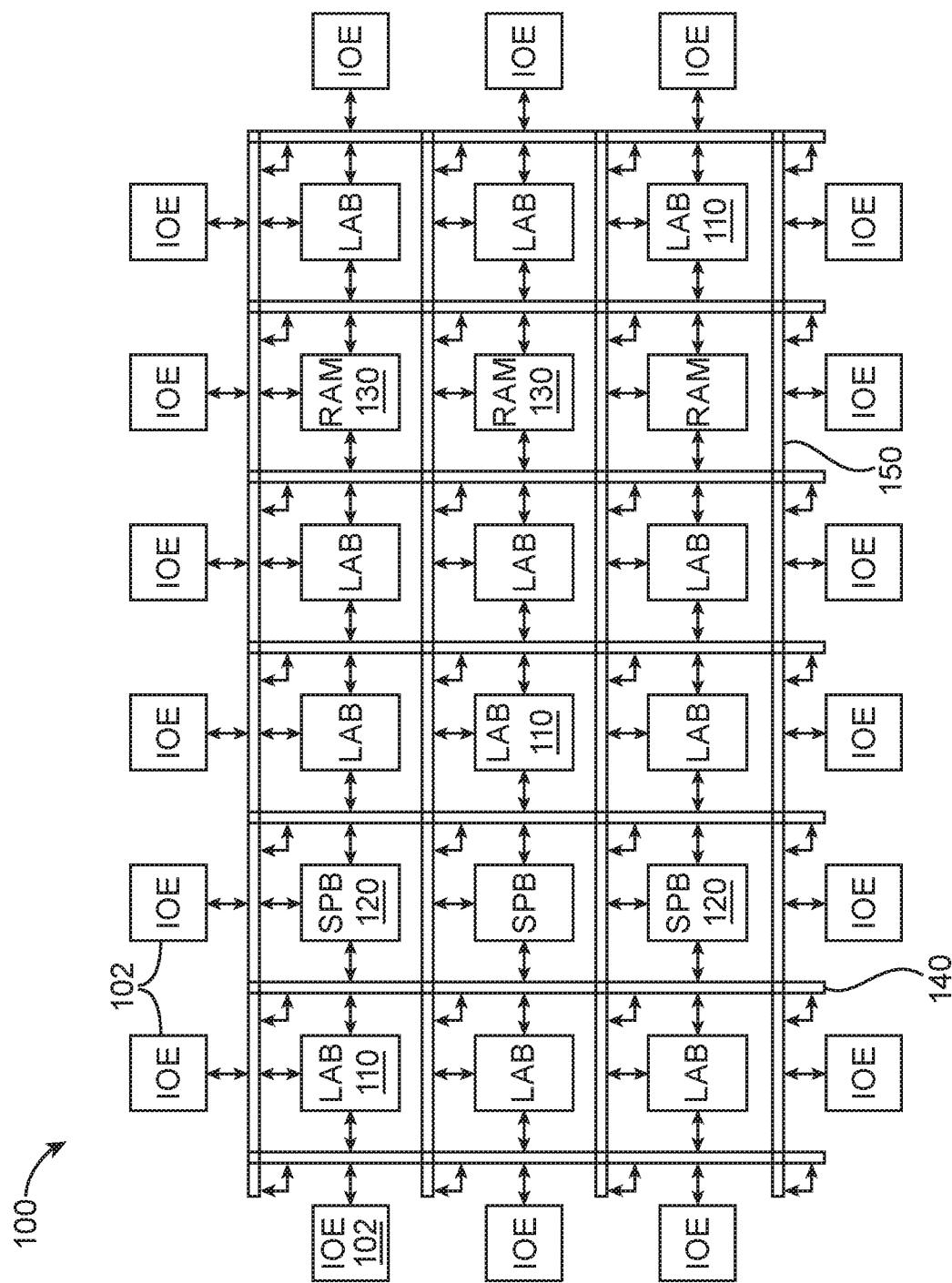
FIG. 2 is a diagram of an illustrative programmable integrated circuit in accordance with an embodiment.

An illustrative embodiment of a programmable integrated circuit such as programmable logic device (PLD) 100 that includes CFMM circuitry is shown in FIG. 2. Embodiments of CFMM circuitry may be implemented in hardware, a configuration of the PLD, or hybrids thereof. As shown in FIG. 2, the programmable logic device (PLD) may include a two-dimensional array of functional blocks, including logic array blocks (LABs) 110 and other functional blocks, such as random-access memory (RAM) blocks 130 and specialized processing blocks such as specialized processing blocks (SPB) 120. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

Furthermore, it should be understood that embodiments of PLDs may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 3A:
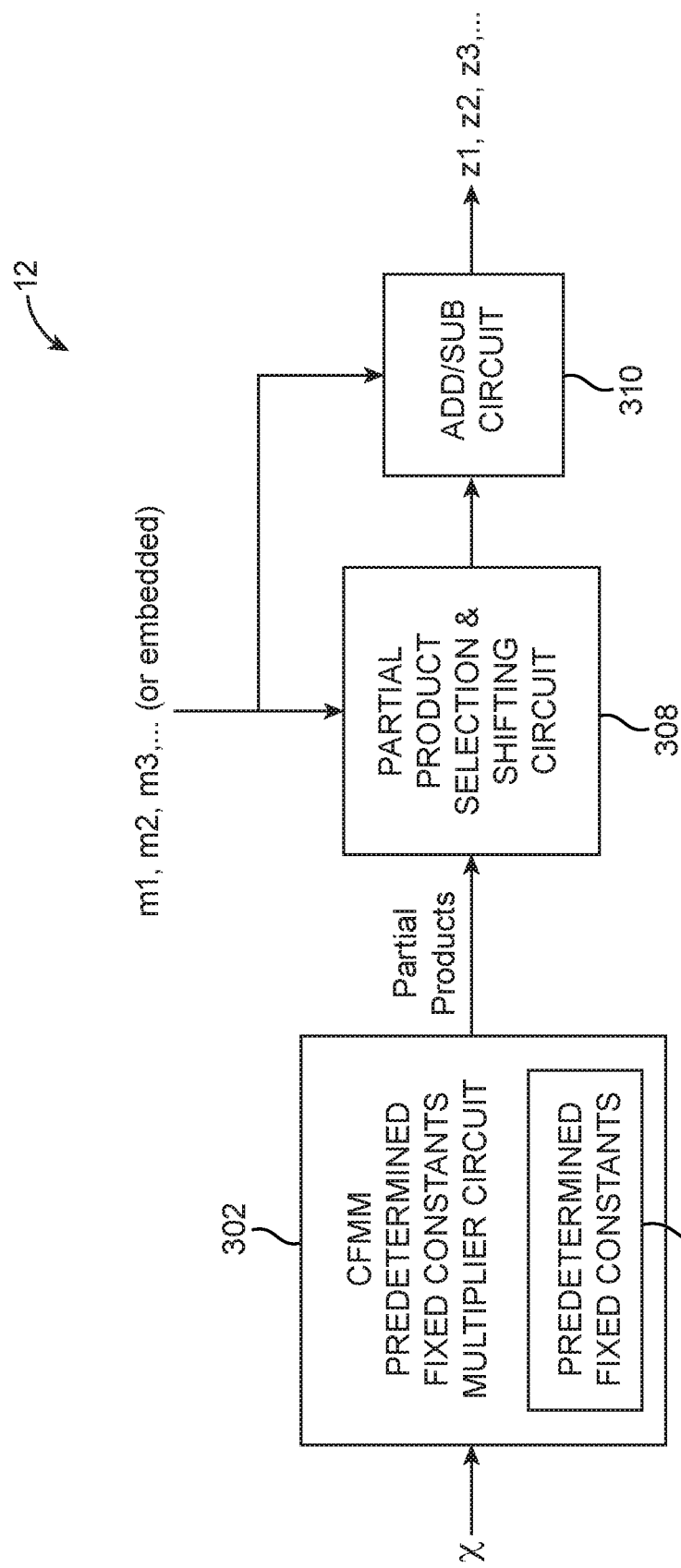
FIG. 3A is a diagram of a CFMM circuit in accordance with an embodiment.

FIG. 3A is a diagram of generic CFMM circuitry 12 for multiplying common operand, x by many second operands m1, m2, m3, etc. As shown in FIG. 3A, CFMM circuitry 12 may include a CFMM predetermined fixed constants multiplier circuit 302, a partial product selection and shifting circuit 308, and an arithmetic circuit 310 (e.g., add/subtract circuits). CFMM predetermined fixed constants multipliers 302 may be configured to receive the common factor operand x and to effectively multiply x by a number of predetermined fixed constants 304 to generate a set of partial products. The predetermined fixed constants 304 and the circuitry of the predetermined fixed constant multipliers 302 are independent of the value of all operands in the multiplication and is only dependent on the numerical format of the multipliers and are not dependent on the actual value of the common operand or the actual values of the multiplier operands. Since these partial products are all used to co-computing the various final products, they are sometimes referred to as "common partial products."

Predetermined fixed constants multiplier 302 (although referred to as a "multiplier") does not include any actual multiplication operator but instead uses add and subtract circuits to effectively multiply the common factor by the predetermined fixed constants 304. The implementation of predetermined fixed constants multiplier 302 and the selection values of the predetermined fixed constants 304 may be optimized independently or jointly to reduce the number and/or complexity of arithmetic operations in multiplier 302. A preferred optimization is to directly implement multiplier circuit 302 as a fixed function circuit to avoid the need to store predetermined fixed constants as real values anywhere on circuit 10 (e.g., multiplier 302 may be implemented as a fixed function circuit for either instance specific embodiments or non-instance specific embodiments). In instance specific embodiments, selection and shifting circuit 308 and arithmetic circuit 310 can also be implemented or configured as fixed function circuits. These optimizations may be optionally applied to the embodiments of FIG. 3 to FIG. 5. In other suitable embodiments, multiplier 302 need not be a fixed function circuit and can perform arithmetic operations based on dynamic multiplier values.

In an embodiment applying such optimizations, the set of fixed constants 304 may be selected such that the predetermined fixed constants multiplier circuits 304 can generate the common partial products using only addition and/or subtractions a first optionally shifted version of x with a second optionally shifted version of x. An example of a fixed constant value fulfilling this requirement may include the binary number 10001 and 11111. Specifically, in this example, multiplication of x by the binary number 10001 may be implemented by adding x-SHL5 (i.e., x shifted left by 5 bit positions) with x-SHL0 (i.e., an unshifted version of x). Meanwhile, multiplication of x by the binary number 11111 may be implemented by subtracting x-SHL0 (i.e., an unshifted version of x) from x-SHL6 (i.e., x shifted left by 6 bit positions).

Multiplier circuit 302 may generate a number of common partial products in this way. In one embodiment, the partial products may be stored in a table of which a subset of its entries may be used in some combination to produce the desired final products z1, z2, z3, etc. In another embodiment, the partial products may be consumed by the partial product selection and shifting circuits 308 immediately without any intermediate storage.

Partial product selection and shifting circuit 308 may receive the partial products from multiplier circuit 302, may optionally select a subset of the received partial products, and may optionally shift some or all the selected partial products. The set of selected and shifted partial products may then be combined using add/subtract circuit 310 (e.g., any number of optionally shifted partial products may be added or subtracted using circuit 310) to generate the final products z1, z2, z3, etc. The selection and shifting in 308 as well as the selection between the use of addition or subtraction in 310 may also be controlled by the received multiplier values (m1, m2, m3, etc.). In another embodiment, the multiplier values (m1, m2, m3, etc.) may be preloaded onto CFMM circuitry 12 and one or more multiplier contexts may be so preloaded and these may also be buffered in CFMM circuit 12.

The partial products are shared by the partial product selection and shifting circuits 308 for the set of all multiplications of x with m1, m2, m3, etc. The partial products are therefore sometimes referred to as common partial products. Generating the partial products once and sharing them amortizes the burden of partial product generation across the set of all common factor multiplications. The selection and shifting circuits 308 and addition/subtraction circuit 310 may be implemented independently for each multiplier or co-optimized to enable further amortization. Some or all of the circuits within arithmetic circuit 310 may be shared when generating final products z1, z2, z3, etc. Some or all of the sharing may be enabled by shifting circuits.

The precision of the common operand/factor may affect the size of the partial products (i.e., a larger common factor x would increase the required bit-width of the predetermined fixed constants 304 and would therefore increase the bit-width of the partial products). On the other hand, the precision of the non-common multiplier operands may affect the required size and complexity of circuits 302, 304, 308 and 310 as well as the number of partial products.

For example in a 6-bit embodiment, the fixed constants may include 111111, 100001, 010001, 001001, 000101, 000011, and 000001. In this example, the predetermined fixed constants may be chosen to represent a minimized/reduced set of constants, which may be the minimum set of constants, for generating all binary values with one to two 1's by only shifting the minimized set of constants left or right. This is merely illustrative. In general, the predetermined fixed constants represent a minimized set of constants for generating all binary values with up to j logic ones by only shifting the minimized set of constants left or right such that the common partial products are generated using a reduced number of add or subtract operations, where j is any integer greater than one. If desired, the minimized set of constants may exclude constants for generating binary values with k logic ones, where k is greater than one but less than j. If desired, the common partial products corresponding to predetermined fixed constants with fewer than j logic ones can be used to recursively generate additional common partial products corresponding to predetermined fixed constants with up to j logic ones.

In this embodiment, the number of select and shift components needed in circuit 308 may be given by the equation:

$$\text{num\_select\_shift} = \text{ceiling}((n-3)/4) \quad (1)$$

where n is equal to the precision of the second operand (e.g., the number of bits in the multipliers) and where the minimum possible value of num_select_shift is one. In this embodiment, num_select_shift scales with n according to equation (1). For example, if n has 0-4 bits, then one select and shift component is needed. As another example, if n has 5-7 bits, then two select and shift components and one add/subtract component are needed. If n has 8-11 bits, then three select and shift components, one add/subtract component, and one add component are needed. If n has 12-15 bits, then four select and shift components, one add/subtract component, and two add components are needed. These examples are merely illustrative and do not serve the limit the scope of the present embodiments.

Moreover, the CFMM circuitry may be composable depending on the precision of the multiplier operands. For example, a direct implementation of a 15-bit multiplier would require three arithmetic operations (e.g., one add/subtract and two adds), as described above. Alternatively, it is possible to use two or more lower multiplier precisions to compose a higher bit width multiplier. For example, an unsigned 15-bit multiplier may be decomposed into an unsigned 8-bit multiplier and an unsigned 7-bit multiplier. A first partial product of the unsigned 8-bit multiplier may require two arithmetic operations, whereas a second partial product of the unsigned 7-bit multiplier may require one arithmetic operation. To combine the two decomposed portions, the first partial product may be shifted left by 8 bits and then concatenated with the second partial product. As another example, to compute x*11110001, the operation may be decomposed into a first portion Y1=x*1111 and a second portion Y2=x*0001. The combined output will then be equal to Y1 shifted left by 4 bits concatenated with Y2.

Figure 3B:
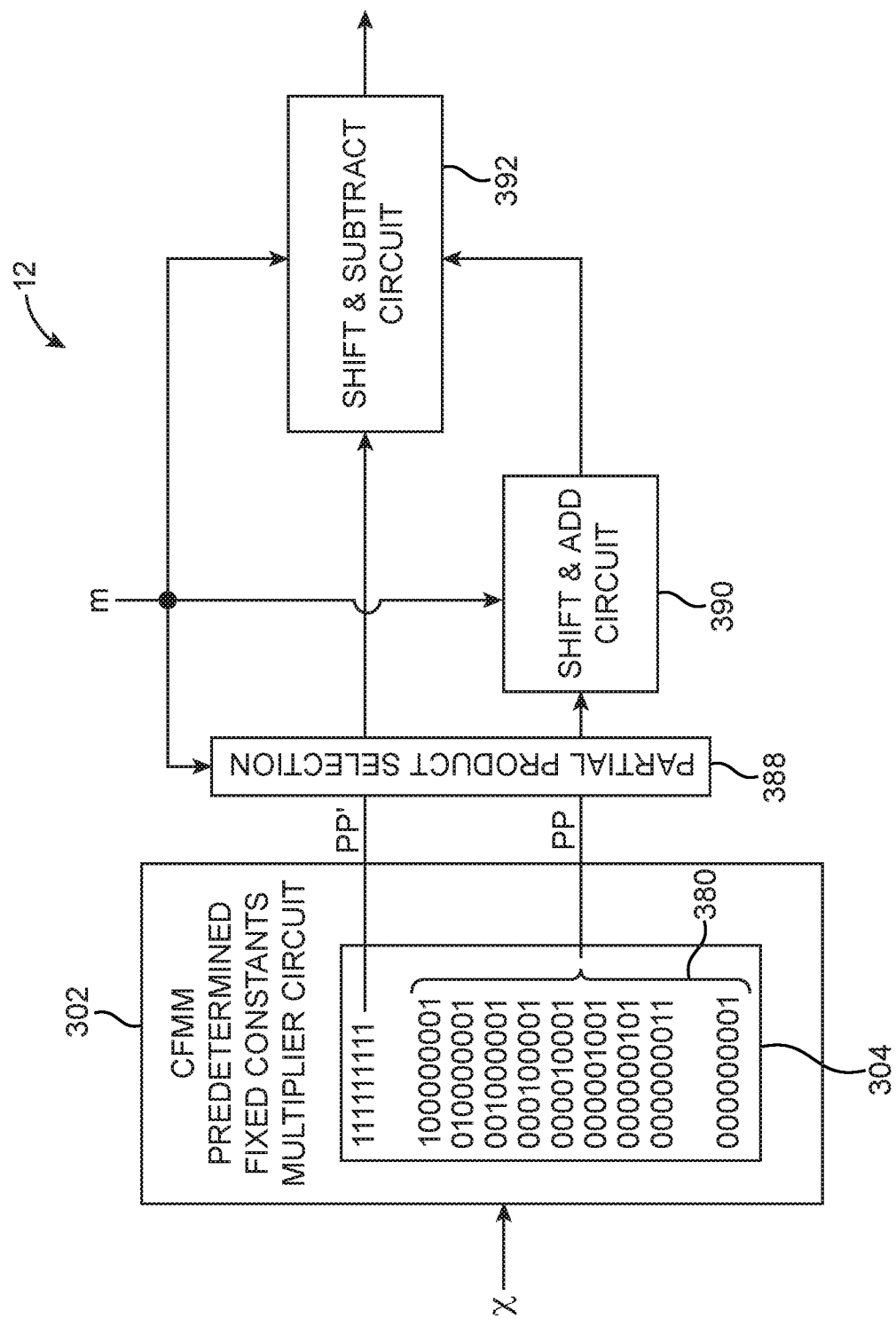
FIG. 3B is a diagram showing illustrative 9-bit CFMM circuitry in accordance with an embodiment.

FIGS. 3A and 3B represent generic versions of the CFMM circuitry and can be implemented either as the instance specific version or the non-instance-specific version. In a preferred embodiment, common factor x may be unsigned. In other suitable embodiments in which common operand x is signed, a negative sign of x may simply negate the final output, the intermediate arithmetic operations, the multiplier, or some combination thereof.

FIG. 3B shows the generic CFMM circuitry 12 of the type shown in FIG. 3A used to multiply a common factor, x with 9-bit multipliers. In FIG. 3B, each row in 304 represents one predetermined fixed constant in binary encoding. In this embodiment, the values of the fixed constants 304 has been methodically selected to simplify implementation of the circuits in 302, 308, and 310. In this example, the constants have the same bit width as the multipliers (i.e., 9 bits). One of the constants (bottom row) has a 1, only in the least significant bit (LSB) position; another constant (2nd from bottom row) has an additional 1 in the second LSB position; yet another constant (3rd from bottom row) has an additional 1 is the third LSB position instead of the second position; and so on until the constant with a 1 in its MSB is generated. An additional constant with 1's in all bit positions is then added and zero (000000000) may also be considered as an additional constant whose partial product is always zero.

Using this specific method for selecting the values of predetermined fixed constants, a fixed operand with zero to two ones can be represented without any add/subtract components (since any 9-bit stream with only two ones can be generated by simply shifting one of the nine bottom rows in 304). An operand with zero to four is can be generated by adding a first value with zero to two is (which requires a first selection/shift component) and a second value with zero to two is (which requires a second selection/shift component). An operand with five to nine is can be generated by subtracting an added partial result with zero to four is from 111111111 (which requires a third selection component).

The specific pattern of the predetermined fixed constants 304 shown in FIG. 3B is merely illustrative. In general, the predetermined fixed constants 304 may represent a minimum set of values that is needed for all one to j is to be generated by shifting left or right, where j can be any integer equal to or greater than two (e.g., the predetermined fixed constants can have more than two 2s). In general, the partial products of the common factor with the predetermined fixed constants can be recursively generated (e.g., fixed constants with two is can be used to generate fixed constants with up to three or four is) or directly generated.

Referring still to FIG. 3B, CFMM predetermined fixed constants multiplier circuit 302 may be designed to generate a partial product PP' from the topmost predetermined fixed constant (i.e., 111111111) and other partial products PP from the remaining predetermined fixed constants (see braces 380). Partial product selection circuit 388 may select from among partial products PP and PP'.

Circuit 390 may selectively shift and add together any number of the selected partial products received from selection circuit 388. In this 9-bit multiplier operand embodiment, it may select zero, one, or two partial products from PP. Additionally, zero is always a valid partial product regardless of whether it is generated by multiplier 302 or not. Circuit 392 may receive a selected PP' from partial product selection circuit 388 (which is trivial for PP' since there is only one value to select from) and may optionally shift the received PP'. Circuit 392 may include a subtraction component for selectively subtracting the output of circuit 390 from the received (optionally shifted) PP'. Circuits 388, 390, and 392 may be controlled by the set of second operands, the multipliers m1, m2, m3, etc. (e.g., the partial product selection, amount of shifting and whether an add/subtract operation is performed may depend on the value of the multipliers). The final products, z1, z2, z3, etc. may be provided at the output of circuit 392.

Figure 4A:
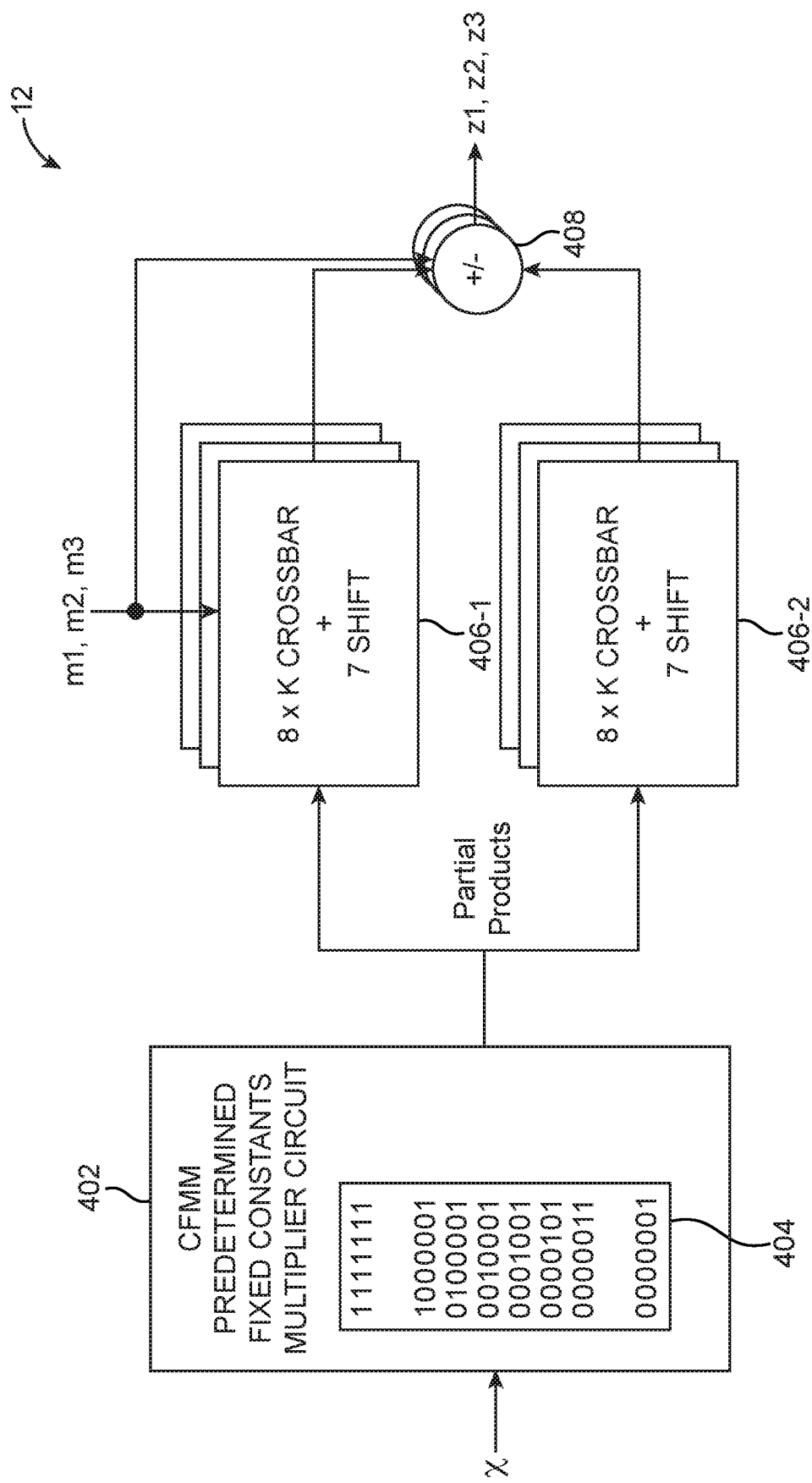
FIGS. 4A-4C are diagrams of non-instance specific versions of 7-bit CFMM circuitry in accordance with an embodiment.
Figure 4B:
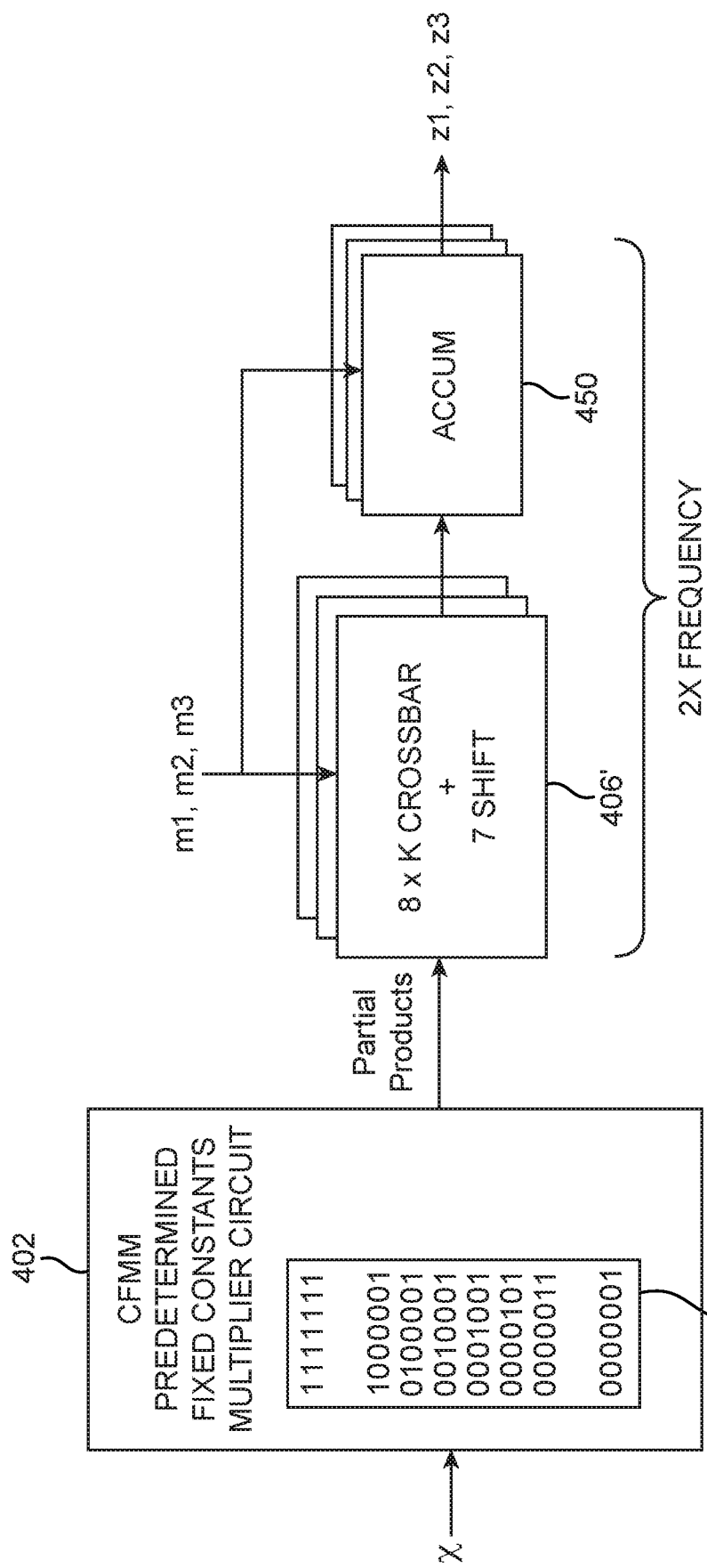
Figure 4C:
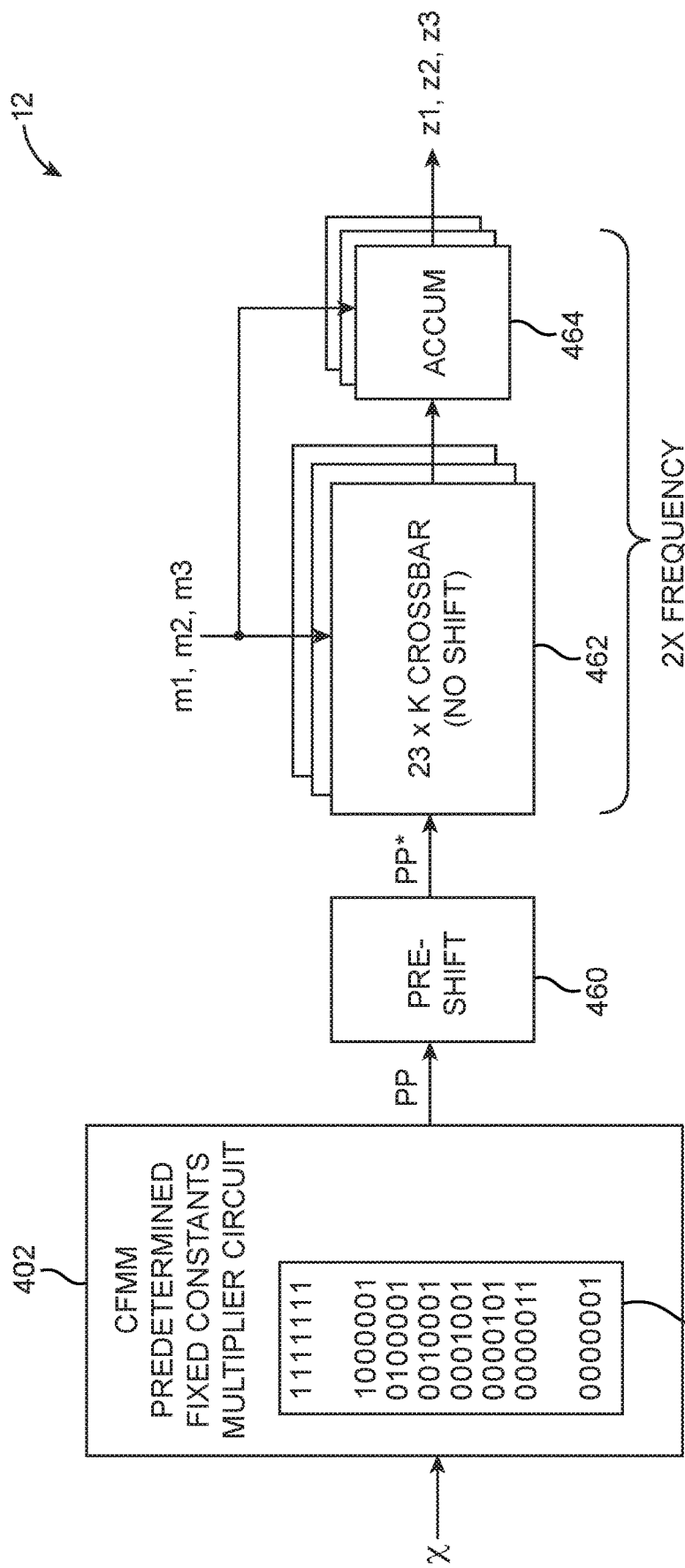

FIGS. 4A-4C are diagrams of non-instance specific versions of 7-bit CFMM circuitry 12 (i.e., where the precision of common operand x is 7 bits). In the non-instance specific version, the value of multipliers m1, m2, m3, etc. can change without having to redesign or reconfigure the hardware of circuitry 12. If desired, the multipliers may be stored locally within CFMM circuitry 12 even for the non-instance specific version. For example, multiplier sets can be preloaded into local memory and used as desired. In general, non-instance specific versions may be implemented on a programmable or non-programmable platform.

As shown in FIG. 4A, show a suitable implementation of CFMM for 7-bit multipliers. This embodiment uses predetermined fixed constants multiplier circuits with 7+1=8 different predetermined constants 404, each having seven bits. In this example, the predetermined fixed constants 404 may be chosen to represent a minimum set of constants for all one to two 1's to be generated by shifting left or right and all 1's. The exemplary pattern of constants 404 in FIG. 4A again has a diagonally striping one across the different rows.

Multiplier circuit 402 may output corresponding partial products. As described above, circuit 402 may be configured to multiply x with the predetermined fixed constants 404 using only add/subtract operations without performing any actual multiplication operations.

A first select and shift circuit 406-1 will route (and optionally shift) a first selected partial product to its output, and a second select and shift circuit 406-2 will route (an optionally shift) a second selected partial product to its output. Circuit 406-1 may include an 8-input crossbar switch for selectively routing one of the partial products to its output and may also include a shifter for shifting the selected signal by up to 7 bits. Circuit 406-2 may also include an 8-input crossbar switch for selectively routing one of the partial products to its output and may also include a shifter for shifting the selected signal by up to 7 bits. The size of circuit 406-2 may be optimized depending on the specific implementation (e.g., a smaller crossbar switch may be used). Parameter K specifies the amount of parallelism per copy of circuits 406-1 and 406-2 and can be any suitable integer.

Both 406-1 and 406-2 may also implicitly select the constant value zero regardless of whether it received zero as a partial product from 402 or not. The selection and amount of shifting performed by circuits 406-1 and 406-2 may be determined by the value of the multipliers. In general, there may be multiple instances of circuits 406-1, 406-2, and 408.

In this embodiment, an arithmetic circuit such as add/subtract circuit 408 may have a first input that receives an operand from circuit 406-1, a second input that receives another operand from circuit 406-2, and compute the final product. Circuitry 12 may optionally include additional shift-accumulate blocks, which can be used to compose results of multiple CFMM blocks of some multiplier bit width to generate the results for multiplications with a multiplier of higher bit width. For example, two 7-bit CFMM blocks can be composed to generate the result of a multiplication with a 14-bit multiplier, three 11-bit CFMM can be composed to generate 33-bit multiplications and so on (not shown).

FIG. 4B illustrates a variation of the embodiment shown in FIG. 4A. Structures in FIG. 4B with the same reference numeral as those in FIG. 4A have the same function and thus need not be described in detail again. CFMM circuitry 12 of FIG. 4B also implements a 7-bit embodiment. Instead of having two circuits 406, however, circuitry 12 of FIG. 4B uses a single circuit 406' to select and shift both partial products. Similar to FIG. 4A, circuit 406' of FIG. 4B may include an 8-input crossbar switch for selectively routing one of the partial products received from circuit 402 to its output and may also include a shifter component for shifting the selected partial product by up to 7 bits. Parameter K specifies the amount of parallelism per copy of circuit 406' and can be any suitable integer. The selection and amount of shifting performed by circuit 406' may be determined by the value of the multipliers.

In particular, circuit 406' and 450 of FIG. 4B may operate at twice the frequency in order to maintain the same throughput as the CFMM circuitry of FIG. 4A. Circuit 406' effectively time-multiplexes the required selection and shifting process, and accumulator block 450 will then combine the signals being output from circuit 406' at different times (e.g., accumulator block may be an arithmetic circuit that receives common partial products from circuit 406' over multiple cycles to generate the final products). Accumulator block 450 is not optional in this time-multiplexing arrangement. If only one partial product is needed for a given product, then accumulator 450 can be idle on alternate clock cycles. In general, there may be multiple instances of circuits 406' and 450.

FIG. 4C illustrates yet another 7-bit non-instance specific implementation of CFMM circuitry 12. Structures in FIG. 4C with the same reference numeral as those in FIG. 4A have the same function and thus need not be described in detail again. As shown in FIG. 4C, CFMM predetermined fixed constants multiplier circuit 402 may generate partial products PP based on built-in predetermined fixed constants 404. Instead of later shifting the partial products after selection, a pre-shifter circuit 460 may be configured to pre-shift partial products PP to generate corresponding pre-shifted partial products PP*. Partial products PP* may cover all possible combinations of predetermined fixed constants with exactly two ones (and including the topmost stream with all is and the bottom stream with only one 1). In the 7-bit embodiment, there may be 23 partial products PP*.

Similar to FIG. 4B, CFMM circuitry 12 of FIG. 4C may include a switching circuit 462 to generate the final products. Circuit 462 may be a 23-input crossbar switch for selectively routing one of the 23 partial products PP* to its output. Parameter K specifies the amount of parallelism per copy of circuit 462 and can be any suitable integer. Circuit 462 does not require any shifting component because all possible combinations of two is are already available. Thus, the size of the switching component can be traded off with the size of the shifter (e.g., increasing the size of the crossbar switch can help reduce the complexity of shifters, and vice versa). In other embodiments, circuit 462 may include additional shifting circuits, but the additional shifting circuits should not repeat any of the pre-shifting performed by pre-shifting circuit 460.

Circuit 462 may also be operated at twice the frequency in order to maintain the same throughput as CFMM circuitry 12 of FIG. 4A. Similar to circuit 406' of FIG. 4B, circuit 462 effectively time-multiplexes the required selection process, and accumulator block 464 will then combine the signals output from circuit 462 at different times. Accumulator block 464 is not optional in this time-multiplexing arrangement. If only one partial product is needed for a given product, then accumulator 464 can be idle on alternate clock cycles. Alternatively, two circuits 462 and an additional adder circuit may be used to generate a given product (see, e.g., FIG. 4A) without requiring an accumulator, and a higher frequency of operation. In general, there may be multiple instances of circuits 462 and 464.

Figure 5A:
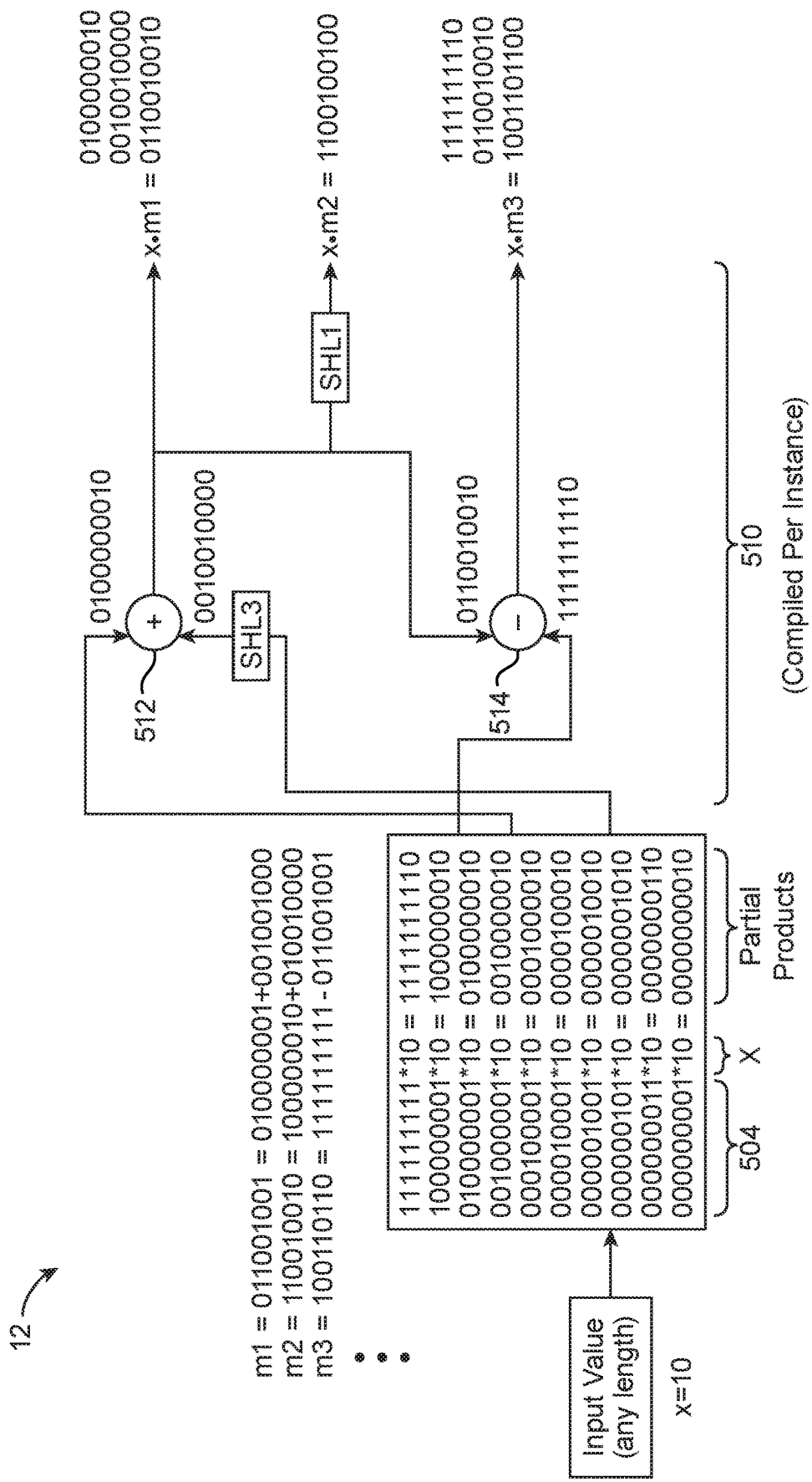
FIG. 5A is a diagram of an instance specific version of 9-bit CFMM circuitry in accordance with an embodiment.

In accordance with another suitable arrangement, CFMM circuitry 12 may also be instance specific (i.e., the hardware has to be redesigned and reconfigured every time any of the multipliers changes). However, the CFMM predetermined fixed constants multiplier need not be redesigned whenever the multipliers change, but the remaining structure of the instance specific CFMM circuitry other than the CFMM predetermined fixed constants multiplier has to be redesigned whenever the multiplier values change. FIG. 5A is a diagram of an instance specific version of 9-bit CFMM circuitry (i.e., where the precision of multiplier operands is 9 bits). Circuitry 12 may receive input common operand x of any length. The multiplier operands are built-in for each set or instance of multiplier values (e.g., operands m1-m3 in the example of FIG. 5A are not actually received by circuitry 510 but are effectively built into circuitry 510 in the form of the specific connection, shifting, and add/subtracting shown in FIG. 5A). In general, instance specific versions may be implemented on a programmable or non-programmable platform. If circuitry 510 were implemented on a programmable integrated circuit, circuitry 510 would be recompiled or reconfigured for every set of multiplier values.

In the example of FIG. 5A, operand x has two bits and is equal to 10 (in binary representation). As shown in FIG. 5A, a CFMM predetermined fixed constants multiplier circuit (not shown) may be used to effectively multiply x with predetermined fixed constants 504 by only performing add/subtract operations to generate corresponding partial products. Once again, predetermined fixed constants 504 may represent a minimized set of constants for generating all binary values with up to two 1's by only shifting the minimized set of constants left or right. The exemplary pattern of constants 504 again has a diagonally striping one across the different rows. The top row has all 1's. A row of all zeros may optionally be included (not shown).

In the example of FIG. 5A, the first final/output product is x*m1. Operand m1=011001001 has four is and can be composed by adding 010000001 (corresponding to the 3rd fixed constant) with 001001000 (corresponding to the 7th fixed constant left shifted by 3). Thus, the first product can be generated by adding the partial product in the 3rd row with the partial product in the 7th row (left-shifted by 3 bit positions) using adder circuit 512. In this scenario, the partial product in the 3rd row and the partial product in the 7th row are selected and shifted before arriving at adder 512.

The second final/output product is x*m2. Operand m2=110010010 has four is and can be composed by adding 100000010 (corresponding to the 3rd fixed constant left shifted by one) with 010010000 (corresponding to the 7th fixed constant left shifted by 4). Upon close inspection, note that m2 is simply m1 left shifted by one bit position. Thus, instead of using another adder circuit and shift circuit to generate the second product, the second product may be output by simply left-shifting the first product by one bit position. Sharing outputs in this way is optional and can help reduce circuitry required for computation.

The third final/output product is x*m3. Operand m3=100110110 has five is and can be composed by subtracting 011001001 (corresponding to m1) from 111111111 (corresponding to the 1st fixed constant). Thus, the third product can be generated by subtracting the first product provided at the output of circuit 512 from the partial product in the 1st row using subtracting circuit 514. In this scenario, the first product from the output of circuit 512 and the partial product in the 1st row are selected and processed before arriving at subtractor 514.

In embodiments where the instance specific version of the type shown in FIG. 5A is formed on a programmable integrated circuit, the shifting, select, and any sharing of the common partial products or final products to compute the final products may be effected using the programmable routing interconnects on the programmable integrated circuit but not its functional blocks (i.e., there is no separate functional block for performing signal selection and shifting). For example, SHL1 and SH3 shown in FIG. 5A are not actual discrete shifting circuits, but the left-shift function is effectuated using programmable routing wires that route bits in the desired direction (i.e., the shifting circuits are effectuated solely through instance-specific routing connections determined by the multiplier values). If desired, the shifting, select, and any sharing of the common partial products may also be carried out using ASIC wires or hard-wired connections (i.e., there is no actual shifting circuit or selection circuit).

The various implementations details described above in connection with FIG. 5A are merely illustrative of a specific instance defined by a set of multiplier values m1, m2 and m3. The circuitry in 510 may be customized and optimized for each specific instance to implement only the desired multiplier values. Configured in these ways, the cost of multiplying a common operand by many other operands is amortized across a large number of multiplications, thereby reducing the effective implementation cost. The non-instance specific and instance specific embodiments can be generally extended to support operands of any bit width.

In instance specific embodiments, instead of creating selection and/or shifting circuits controlled by multiplier values, circuitry 510 may simply route partial product and offset associated with multiplier value of the desired instance directly to the adders and/or subtractors. This effectively eliminates select and shift circuits 308 in FIG. 3A. This may be done for some mix of the shift and select circuitry. Instance specific embodiments may also use the multiplier values to optimize specific instances of the add/sub circuit 310 in FIG. 3A to be add only or subtract only.

In another suitable arrangement, circuitry 510 may be customized and optimized for more than one set of multiplier values. This allows the same CFMM circuit to be used for that set of instances without redesigning circuitry 510. In this embodiment, the implementation of circuitry 510 may co-optimize across several instances to further amortize implementation overhead. In this arrangement, additional selector signals may be used to select between different instances each associated with a set of multiplier values. This may incur additional overhead on circuitry 510 when compared to a single instance implementation but may still be more efficient that implementing each instance independently.

Figure 5B:
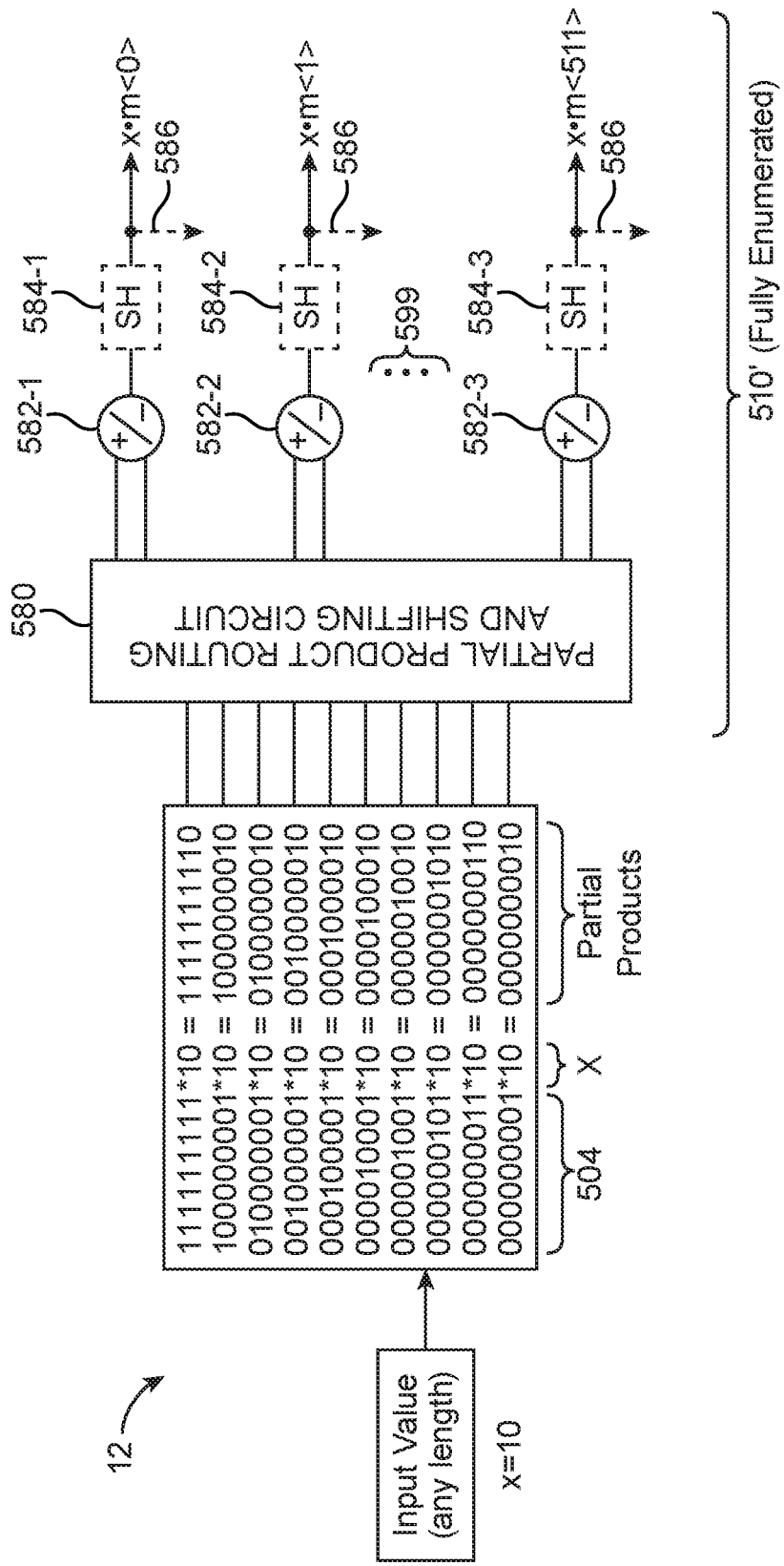
FIG. 5B is a diagram of an instance specific version of 9-bit CFMM circuitry where all unique multiplier values are fully enumerated in accordance with an embodiment.

FIG. 5B shows yet another suitable arrangement in which circuitry 510' may be customized and optimized to compute the product for all possible unique multiplier values. As shown in FIG. 5B, circuitry 510' may include partial product routing and shifting circuit 580 for selectively routing and shifting the partial products to corresponding adder/subtractor circuits 582. In this case, the multiplier operands are 9 bits each, so there are 2^9 or 512 unique multiplier values.

For example, routing and shifting circuit 580 may output a first set of partial products to +/− circuit 582-1, a second set of partial products to +/− circuit 582-2, . . . , and another set of partial products to +/− circuit 582-3. Add/subtract circuit 582-1 may produce a first output that is optionally shifted left using shifting circuit 584 to generate first product X*m<0>, where m<0> is 000000001. Similarly, add/subtract circuit 582-2 may produce a second output that is optionally shifted right or left using shifting circuit 584-2 to generate second product X*m<1>, where m<1> is 000000010. Add/subtract circuit 582-3 may produce a third output that is optionally shifted right or left using shifting circuit 584-3 to generate product X*m<511>, where m<511> is 111111111. The output of each circuit 582 may be fed back as an input to any of the circuits 582, as indicated by path 586. Some of the outputs can be generated directly using only one partial product without circuit 582 or 584 (e.g., *1, *3, *5, etc.), or with circuit 584 but without circuit 582 (e.g., *2, *4, *6, *10, etc.). Circuitry 510' may include other circuits 582 and 584 to generate the final products for all intermediate multiplier values between 000000000 and 111111111, as indicated by ellipses 599. Note that in a typical implementation, the multiply by 0 and multiply by 1 are special cases, and they don't require any computation circuitry. Using the arrangement where there is more than one sequence to generate various outputs, selecting only one would be sufficient to avoid duplication of circuitry.

CFMM circuitry 12 that is configured in this way to output products for all possible multiplier values is sometimes referred to as a "fully-enumerated" CFMM multiplier. A fully-enumerated CFMM circuitry allows the same CFMM circuitry to be used for any set of instances without having to redesign circuitry 510', as long as the bit width of the multiplier operand does not increase beyond 9 bits. If desired, circuitry 510' may be fully enumerated for multiplier values of any suitable bit width.

In general, these techniques may suitable for applications requiring multiplication of a common operand by many multipliers such as a typical matrix multiplication or applications such as convolution neutral networks (CNNs), deep neural nets (DNNs), etc.

Figure 6:
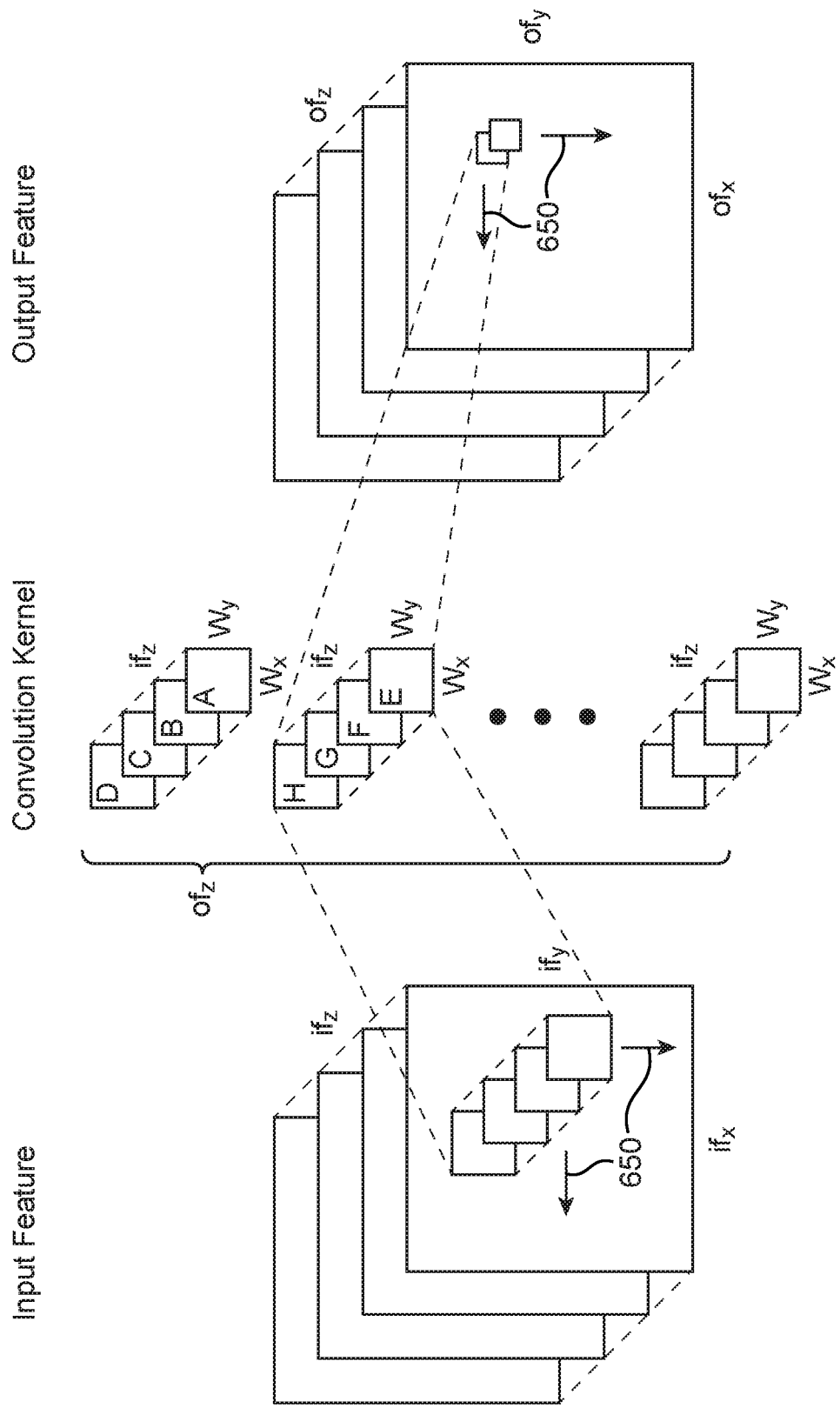
FIG. 6 is a diagram illustrating an output-centric implementation of a convolution neural network.

FIG. 6 is a diagram illustrating an output-centric implementation of a convolutional layer in a convolution neural network. As shown in FIG. 6, input feature maps are convolved with convolution kernels such as weight matrices to produce output feature maps. Arrows 650 illustrate the direction of convolution. There may be $if_z$ 2 dimensional input feature maps, where each input feature map has $if_x$ columns and $if_y$ rows. There may be $of_z$ 2 dimensional output feature maps, where each output feature map has $if_x$ columns and $if_y$ rows. There may be $of_z$ groups of weight matrices, where each of the $of_z$ groups includes $if_z$ weight matrices. Each weight matrix may include $w_x$ by $w_y$ weights. Numbers $if_z$ and $of_z$ are both shown to be equal to four in the example of FIG. 6, but they may generally be different numbers.

To generate an output feature in an output feature map, $if_z$ groups of input features are convolved with $if_z$ corresponding weight matrices, as shown by the dotted lines in FIG. 6. Different groups of weight matrices are used depending on which of the output feature maps are being generated. In the arrangement of FIG. 6, an output feature map is computed by convolving all rows and columns in all input feature maps with weight matrices A-D, whereas a second output feature map is computed by convolving all rows and columns in all input feature maps with weight matrices E-H, and so on.

In accordance with an embodiment, the CNN operation may be reformulated to enable an input-centric computation by grouping computations with the same (common factor) input together and executing those computations concurrently, thereby leveraging the capabilities of CFMM circuitry 12 shown in FIGS. 3-5.

Figure 7:
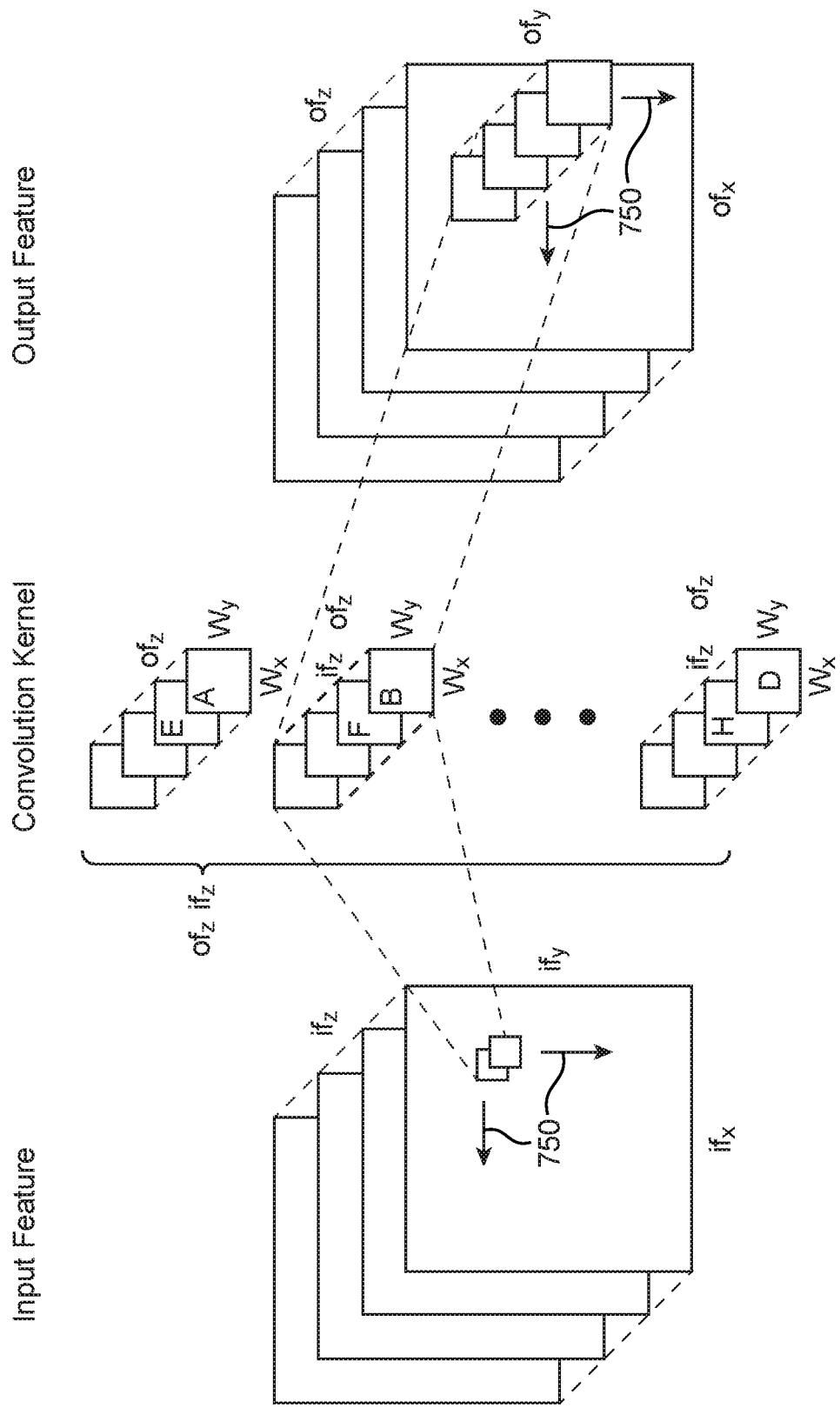
FIG. 7 is a diagram illustrating an input-centric implementation of a convolution neural network (CNN) using the CFMM circuitry shown in FIGS. 1-5 in accordance with at least some embodiments.

FIG. 7 is a diagram illustrating an input-centric implementation of one convolutional layer in a convolution neural network (CNN). Instead of having $of_z$ groups of $if_z$ weight matrices, the weight matrices may be reorganized into $if_z$ groups of $of_z$ weight matrices (e.g., note that $if_z$ and $of_z$ are now swapped in comparison to FIG. 6, and weight matrices A-H are redistributed into different groupings). Thus, a single input feature (which is a common factor) is now convolved or multiplied with a corresponding group of $of_z$ weight matrices (which are multiplier values) to generate $of_z$ groups of output features in parallel (as shown by the dotted lines in FIG. 7). Arrows 750 illustrate the direction of convolution.

In particular, each input feature map (which represents a set of common factors) may be multiplied by a set of weight matrices using one CFMM circuitry in a set of CFMM circuitries. The number of CFMM circuitries may therefore be equal to the number of input feature maps (i.e., $if_z$). Each CFMM circuitry can then multiply its set of common factors by its multiplier values to generate a set of terms in at least one output feature map. An additional arithmetic circuit can then accumulate at least one set of terms generated from each CFMM circuitry in the set of CFMM circuitries to generate a final value for the output feature map.

The example above where there is a 1:1 mapping between the number of CFMM circuitries and the number of input feature maps is merely illustrative. A one-to-many or many-to-one mapping can also be implemented. As an example, at least CFMM circuitry may receive common factors from more than one input feature map. As another example, more than one CFMM circuitry can receive common factors from a shared input feature map.

Configured in this way, the input feature serves as the common factor operand, whereas the weight matrices (also known as the convolution kernels) serve as the second operand. By performing input-centric CNN processes using the various non-instance specific and instance specific CFMM implementations described in connection with FIG. 1 through FIG. 5, the implementation cost of the convolution may be dramatically reduced since the cost is now amortized across a large set of multiplications with the same common factor operand.

The embodiment of FIG. 7 in which CFMM circuitry 12 may be used to implement a CNN application is merely illustrative and is not intended to limit the scope of the present embodiments. In general, CFMM circuitry 12 may be adopted to support any application requiring multiplication of a common operand by any number of multipliers. The output-centric CNN implementation of FIG. 6 and the input-centric CNN implementation of FIG. 7 represent two extremes. If desired, intermediate versions between the two extremes may be implemented and CFMM may be applied to an intermediate version to the extent that version has exposed common factors.

In one suitable arrangement, any of the individual adders within CFMM circuitry 12 such as adders within CFMM fixed constants multiplier circuit 302 or 402, adders within instance specific logic circuitry 510 and 510', and adder circuits 310, 390, 392, 408, 450, and 464 may combine bits in a parallel fashion. The term "adder" may generically refer to an add/subtract circuit that can compute the sum of two input numbers and/or the difference between two input numbers.

Figure 8:
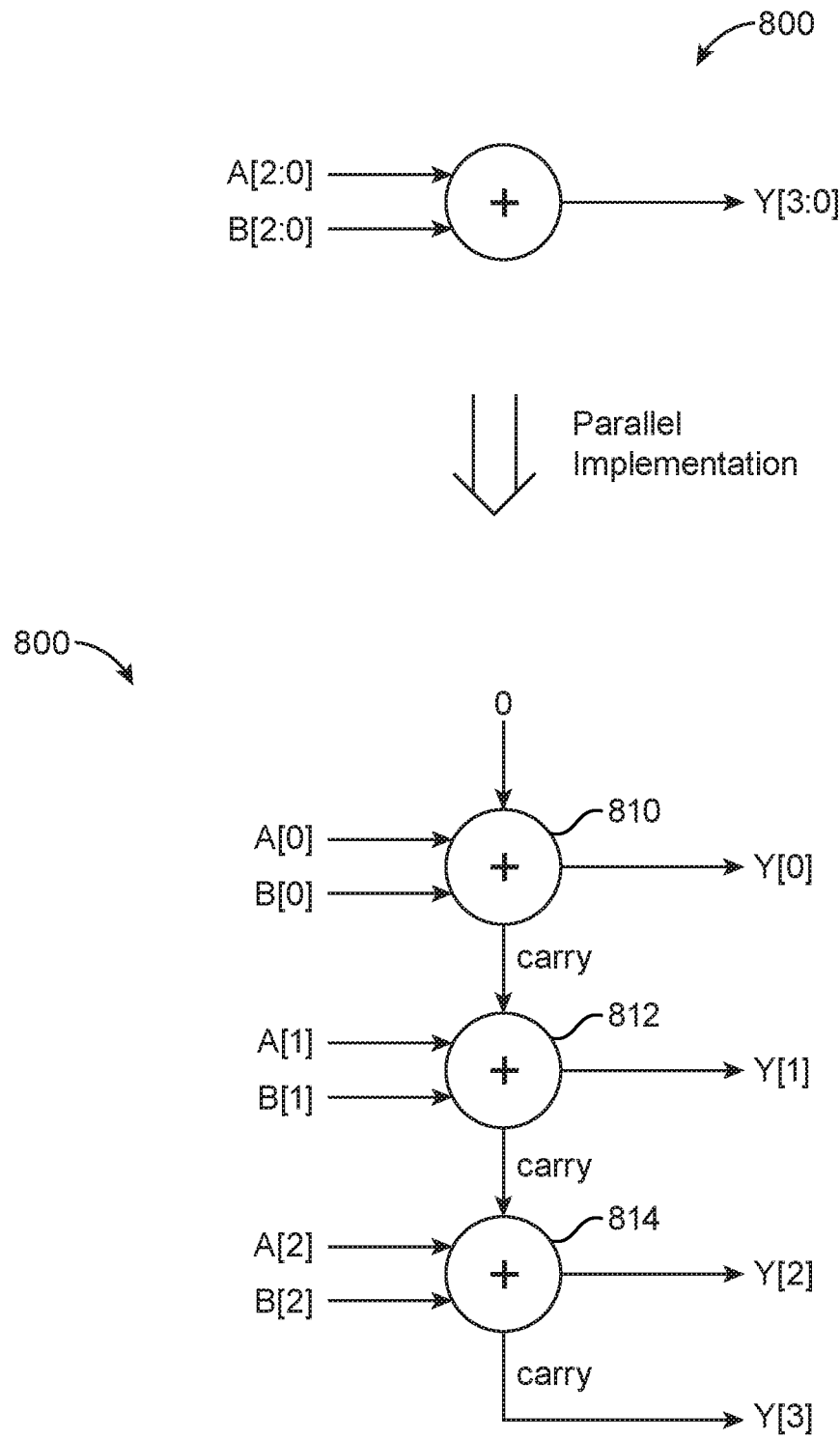
FIG. 8 is a diagram showing how adders within CFMM circuitry can be implemented using a parallel configuration in accordance with an embodiment.

FIG. 8 is a diagram showing an exemplary adder circuit 800 configured to add bits using a parallel implementation. Adder circuit 800 receives a first input signal A[2:0] and a second input signal B[2:0] and generates corresponding output Y[3:0]. As shown in FIG. 8, adder circuit 800 may include a first adder 810, a second adder 812, and a third adder 814. Three adders are needed since the inputs are 3-bits wide.

First adder 810 has first and second input ports that receive the least significant bit A[0] of the first input signal and the least significant bit B[0] of the second input signal, respectively, and a carry-in input port that receives zero to generate a corresponding output bit Y[0]. Second adder 812 has first and second input ports that receive bit A[1] of the first input signal and bit B[1] of the second input signal, respectively, and a carry-in input port that receives the carry output signal from adder 810 to generate a corresponding output bit Y[1]. Third adder 814 has first and second input ports that receive the most significant bit A[2] of the first input signal and the most significant bit B[2] of the second input signal, respectively, and a carry-in input port that receives the carry output signal from adder 812 to generate a corresponding output bit Y[2]. Adder 814 also has a carry output port at which output bit Y[3] is generated.

Adder circuit 800 configured in this way can generate output Y[3:0] in a single clock cycle but uses three separate adders 810, 812, and 814. If the multiplier operand is 9 bits, adder circuit 800 would need at least full adders for 9 bits connected in a chain. When the number of multiplier values or the number of weights that need to be multiplied using the CFMM circuitry increases, the parallel adder implementation of FIG. 8 may require a large number of adders, which increases cost.

Figure 9:
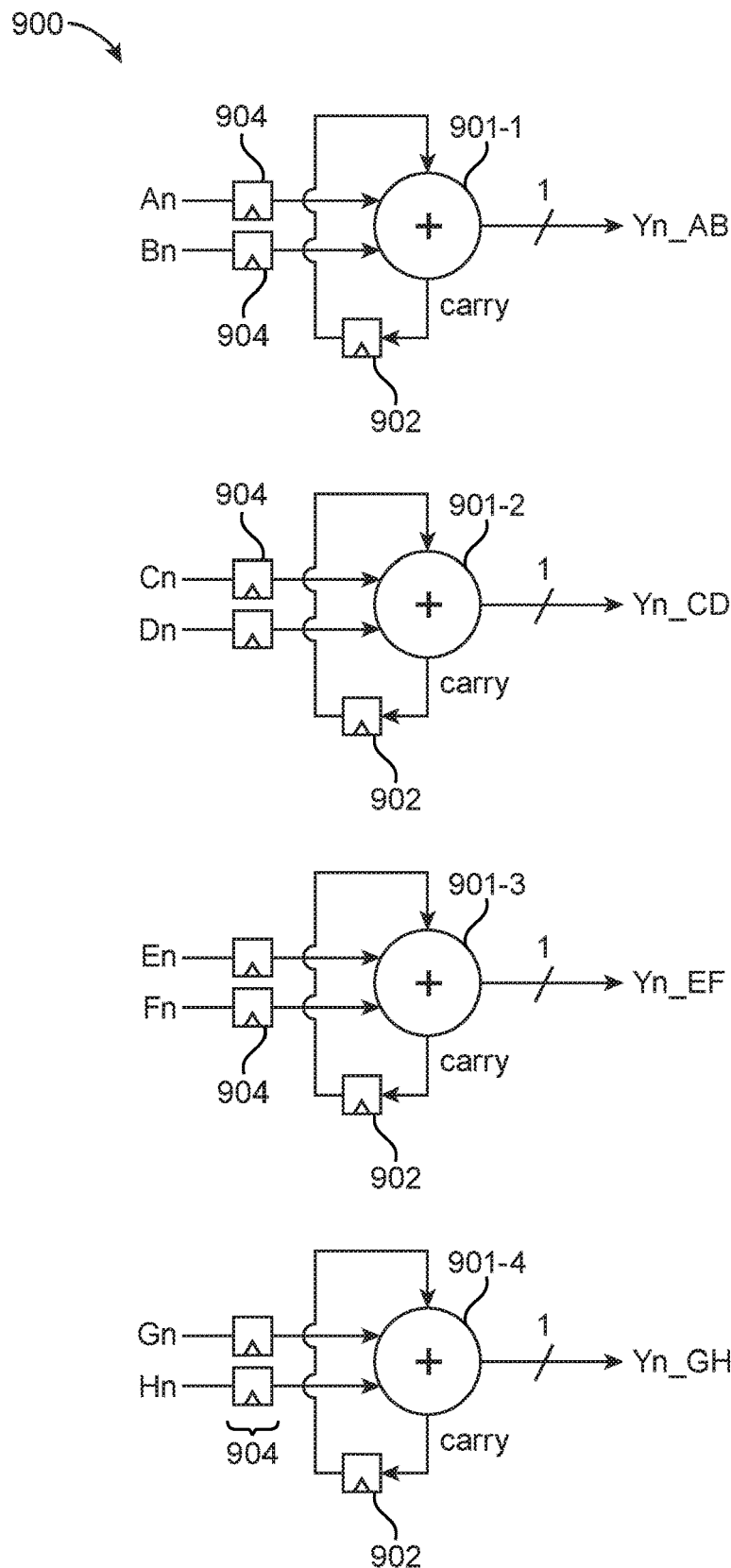
FIG. 9 is a diagram showing how adders within CFMM circuitry can be implemented using a bit-serial configuration in accordance with an embodiment.

The adder circuits within CFMM circuitry 12 may instead be optionally implemented using a bit-serial adder configuration shown in FIG. 9. The term "bit-serial" means that bits are being processed serially one bit at a time. As shown in FIG. 9, adder circuitry 900 may include a first adder 901-1, a second adder 901-2, a third adder 901-3, and a fourth adder 901-4 that are used to add together n-bit input signals. Adder 901-1 has a first input port that serially receives successive bits from n-bit input signal "An" via a respective input register 904, a second input port that serially receives successive bits from n-bit input signal "Bn" via a respective input register 904, a carry-in input port that receives a latched version of the carry output signal generated by adder 901-1 via feedback register 902, and a single-bit output at which bits of output Yn_AB are serially generated.

Adder 901-2 has a first input port that serially receives successive bits from n-bit input signal "Cn" via a respective input register 904, a second input port that serially receives successive bits from n-bit input signal "Dn" via a respective input register 904, a carry-in input port that receives a latched version of the carry output signal generated by adder 901-2 via feedback register 902, and a single-bit output at which bits of output Yn_CD are serially generated.

Adder 901-3 has a first input port that serially receives successive bits from n-bit input signal "En" via a respective input register 904, a second input port that serially receives successive bits from n-bit input signal "Fn" via a respective input register 904, a carry-in input port that receives a latched version of the carry output signal generated by adder 901-3 via feedback register 902, and a single-bit output at which bits of output Yn_EF are serially generated.

Adder 901-4 has a first input port that serially receives successive bits from n-bit input signal "Gn" via a respective input register 904, a second input port that serially receives successive bits from n-bit input signal "Hn" via a respective input register 904, a carry-in input port that receives a latched version of the carry output signal generated by adder 901-4 via feedback register 902, and a single-bit output at which bits of output Yn_GH are serially generated.

Configured in this way, assuming each of inputs An-Hn are 3 bits wide, it would take a total of four clock cycles to finish generating corresponding outputs Y. In other words, assuming the inputs are n bits wide, the bit-serial adder implementation would require (n+1) clock cycles to generate the sum. Compared to the parallel implementation example of FIG. 8, the bit-serial implementation of FIG. 9 takes four times longer to compute the output, but it has four times the multiplication capacity (i.e., it can perform multiplication for four pairs of input parameters instead of just one) at the cost of only one additional adder. In other words, the bit-serial arrangement has N times more multiplication capacity than the parallel implementation. The bit-serial configuration can support a much larger number of parameters and weights for common factor mass multiplication for the same amount circuitry.

Figure 10:
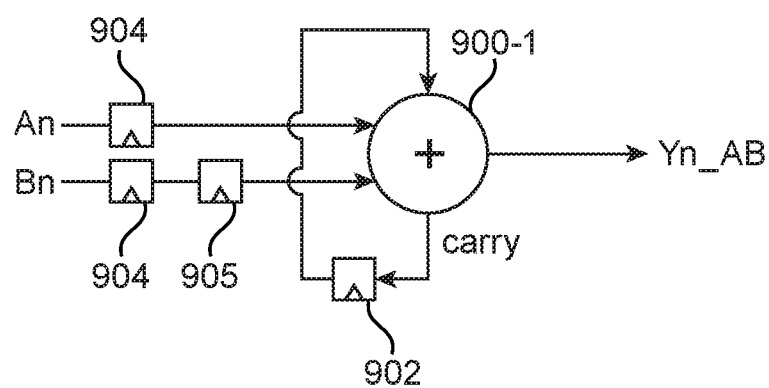
FIG. 10 is a diagram showing how additional input registers may be inserted to multiply input values by powers of two for the bit-serial configuration in accordance with an embodiment.

FIG. 10 is a diagram showing how additional input registers may be added for shifting bits in the bit-serial configuration in accordance with an embodiment. As shown in FIG. 10, an additional input register 905 may be inserted to delay input Bn by one clock cycle, which effectively shifts Bn left by one bit position and thus multiplies Bn by a factor of two. In general, one or more registers 950 may be inserted at any one of the adder inputs to selectively shift the input bits by any factor of two.

Figure 11:
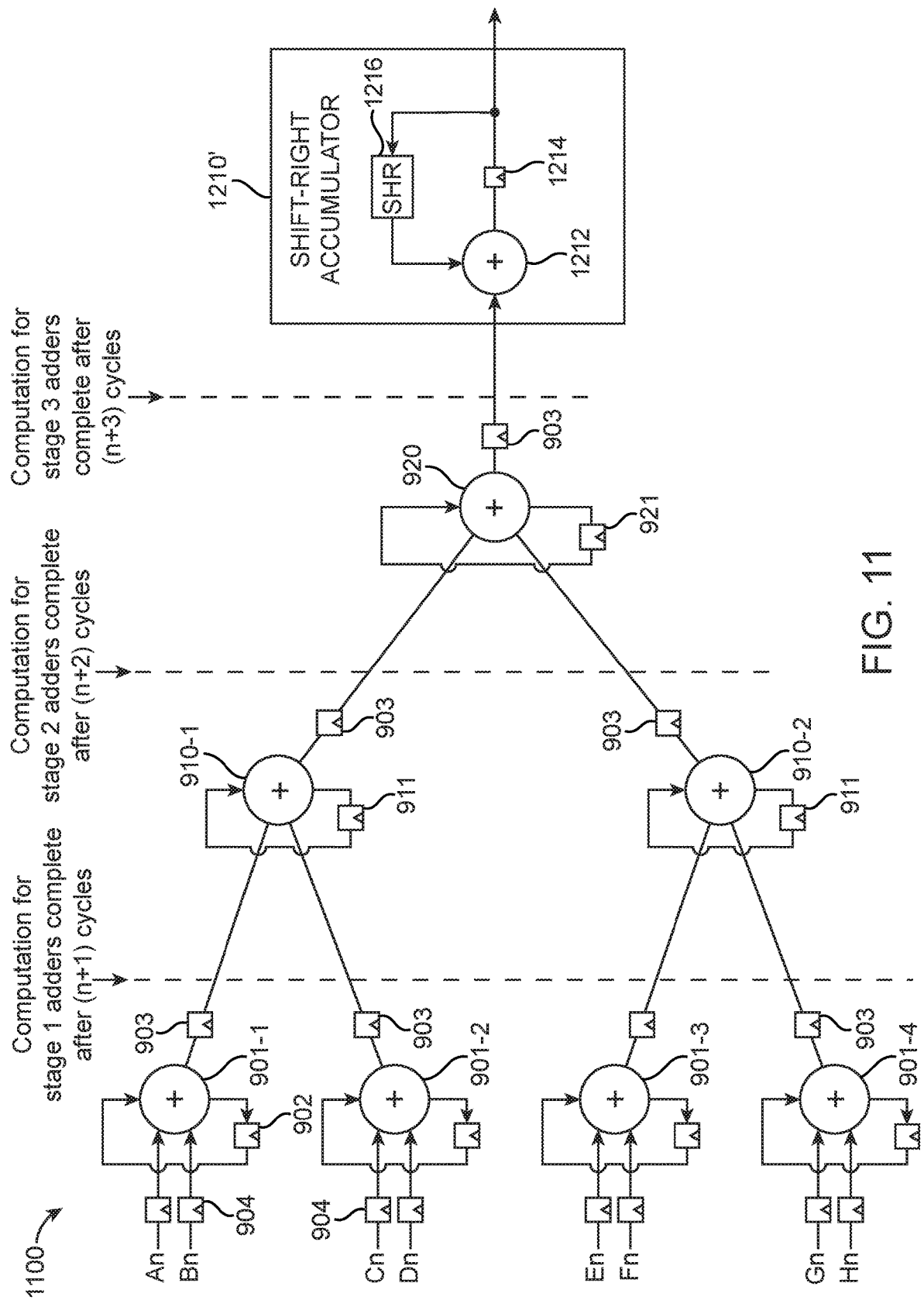
FIG. 11 is a diagram showing how eight inputs can be summed together in a bit-serial fashion in accordance with an embodiment.

FIG. 11 is a diagram showing how the eight inputs from FIG. 9 can be summed together by connecting the bit-serial adders in a tree configuration. Note that adder trees are more applicable where a large number of sums need to be computed (e.g., in a CNN application where CFMM outputs are produced). As shown in FIG. 11, adder tree 1100 may include a first adder stage having bit-serial adders 901-1, 901-2, 901-3, and 901-4, a second adder stage having bit-serial adders 910-1 and 910-2, and a third adder stage having bit-serial adder 920. Note that registers such as registers 903 may be optionally inserted at the output of each adder stage. As described above in connection with FIG. 9, computation for the first adder stage may be complete after (n+1) clock cycles. If desired, output registers 903 can also be omitted.

Adder 910-1 in the second stage has a first input port that serially receives successive bits from the output of adder 901-1, a second input port that serially receives successive bits from the output of adder 901-2, a carry-in input port that receives a latched version of the carry output signal generated by adder 910-1 via feedback register 911, and a single-bit serial output. Similarly, adder 910-2 in the second stage has a first input port that serially receives successive bits from the output of adder 901-3, a second input port that serially receives successive bits from the output of adder 901-4, a carry-in input port that receives a latched version of the carry output signal generated by adder 910-2 via feedback register 911, and a single-bit serial output. Computation for the second adder stage may be complete after (n+2) clock cycles.

Adder 920 in the third stage has a first input port that serially receives successive bits from the output of adder 910-1, a second input port that serially receives successive bits from the output of adder 910-2, a carry-in input port that receives a latched version of the carry output signal generated by adder 920 via feedback register 921, and a single-bit serial output at which the final sum of difference is provided. Computation of the third adder stage may be complete after (n+3) clock cycles. In general, computation at the last adder stage may be completed after (n+m) cycles, where m is equal to the ceiling of $\log_2(i)$, where i is the total number of input terms to be added by the adder tree. In the example of FIG. 11, there are 8 input terms A-H, so m is equal 3 (i.e., the ceiling of $\log_2(8)$ is equal to 3).

Since each stage is latched using the feedback registers, the intermediates outputs of adder tree (i.e., the four outputs of the first adder stage and the two outputs of the second adder stage) are usable. In other words, it is possible to tap or access the output of adder 901-1 to obtain the sum of inputs A+B. As another example, it is possible to tap or access the output of adder 901-4 to obtain the sum of inputs G+H.

The output of the last adder stage may be optionally accumulated using an accumulator circuit such as shift-right accumulator 1210'. Shift-right accumulator 1210' may include an adder 1212, a register 1214, and a right-shift circuit (SHR) 1216. Adder 1212 may have a first input that receives bit-serial signals from the last adder stage. The output latched by register 1214 may be fed back to a second input of adder 1212 after being right shifted by one bit position using shifter 1216.

As described above, the computation of adder 920 will be complete after (n+3) clock cycles. Since the computation of the first adder stage will be complete after only (n+1) clock cycles, the four adders 901 in the first adder stage will be idle for two full clock cycles. Similarly, since the computation of the second adder stage will be done after (n+2) clock cycles, the two adders 910 in the second adder stage will be idle for one full clock cycle. This idling of intermediate adders wastes the potential performance of the CFMM circuitry, which is exacerbated when adder tree 1100 is expanded to sum together more than 8 inputs, 8-16 inputs, 16-32 inputs, 32-64 inputs, 64-128 inputs, 128-256 inputs, 256-512 inputs, 512-1024 inputs, or other suitable number of input signals. The minimum of clock cycles required to compute the final output will increase with the number of inputs.

Figure 12A:
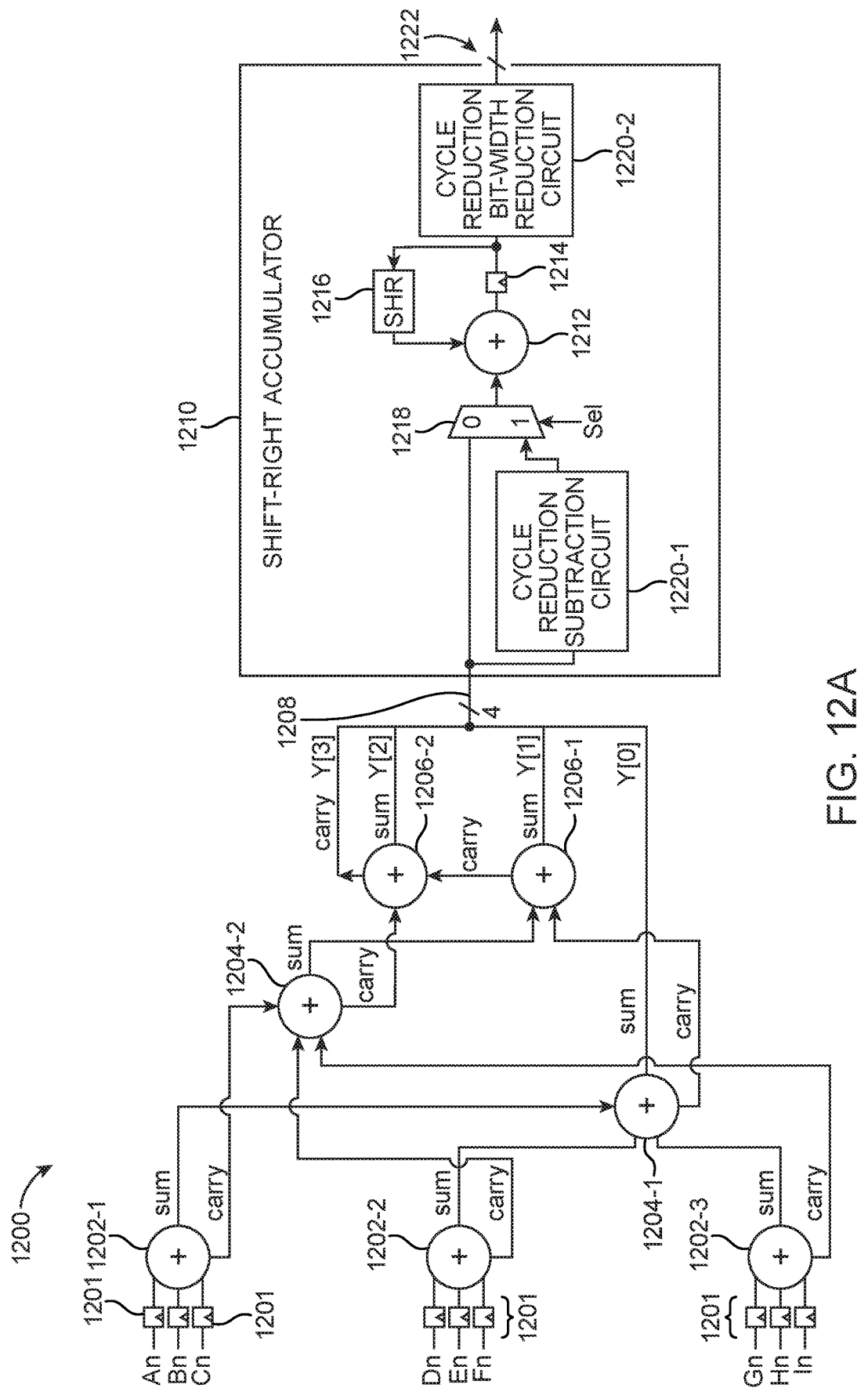
FIG. 12A is a diagram of an adder tree utilizing a 3:2 reduction scheme for summing together nine inputs in accordance with an embodiment.

To avoid the idling of intermediate adder stages, an adder tree such as adder tree 1200 of FIG. 12A uses a 3:2 reduction scheme at each individual adder by receiving input signals at all of its three input ports and feeding forward both sum and carry signals to obviate the need for a feedback register. As shown in FIG. 12A, adder tree circuit 1200 has a first adder stage having adders 1202-1, 1202-2, and 1202-3, a second adder stage having adders 1204-1 and 1204-2, and a third adder stage having adders 1206-1 and 1206-2.

Adder 1202-1 in the first stage may have a first (carry) input port that serially receives successive bits from n-bit input signal An via a respective input register 1201, a second input port that serially receives successive bits from n-bit input signal Bn via a respective input register 1201, a third input port that serially receives successive bits from n-bit input signal Cn via a respective input register 1201, a sum output port, and a carry output port.

Similarly, adder 1202-2 in the first stage may have a first (carry) input port that serially receives successive bits from n-bit input signal Dn via a respective input register 1201, a second input port that serially receives successive bits from n-bit input signal En via a respective input register 1201, a third input port that serially receives successive bits from n-bit input signal Fn via a respective input register 1201, a sum output port, and a carry output port.

Adder 1202-3 in the first stage may have a first (carry) input port that serially receives successive bits from n-bit input signal Gn via a respective input register 1201, a second input port that serially receives successive bits from n-bit input signal Hn via a respective input register 1201, a third input port that serially receives successive bits from n-bit input signal In via a respective input register 1201, a sum output port, and a carry output port.

Adder 1204-1 in the second stage may have a first (carry) input port that is coupled to the sum output port of adder 1202-1, a second input port that is coupled to the sum output port of adder 1202-2, a third input port that is coupled to the sum output port of adder 1202-3, a sum output port, and the carry output port. Adder 1204-2 in the second stage may have a first (carry) input port that is coupled to the carry output port of adder 1202-1, a second input port that is coupled to the carry output port of adder 1202-2, a third input port that is coupled to the carry output port of adder 1202-3, a sum output port, and the carry output port.

Adder 1206-1 in the third stage may have a first input port that is coupled to the sum output port of adder 1204-2, a second input port that is coupled to the carry output port of adder 1204-1, a sum output port, and a carry output port. Adder 1206-2 in the third stage may have a first input port that is coupled to the carry output port of adder 1204-2, a second input port that is coupled to the carry output port of adder 1206-1, a sum output port, and a carry output port. Since there are nine inputs A through I, four parallel output bits Y[3:0] are sufficient to encode the sum of nine bits. In particular, Y[0] may be provided directly at the sum output port of adder 1204-1 in the second stage; Y[1] may be provided directly at the sum output port of adder 1206-1 in the third stage; Y[2] may be provided directly at the sum output port of adder 1206-2 in the third stage; and Y[3] may be provided directly at the carry output port of adder 1206-2.

Arranged in this way, adder tree 1200 is configured to perform bit-serial arithmetic and to convert the serial input bits into parallel form. The parallel output Y represents the number of logic ones in the input stream. Thus, adder tree 1200 is sometimes referred to as a "one counter." Since there are no registers between each successive adder stage, we cannot use intermediate output values. However, the implementation of FIG. 12A is able to compute the final sum in only n cycles instead of (n+m) cycles relative to the example of FIG. 11. Thus, no cycles are wasted, and the performance of the CFMM circuitry can be optimized.

The 3:2 reduction scheme of FIG. 12A in which each individual adder takes in three inputs and produces two outputs is merely illustrative and is not intended to limit the scope of the present embodiments. If desired, a 7:3 adder reduction scheme, a 15:4 reduction scheme, or other suitable reduction schemes can be used to encode the summed bits. In general, adder circuit 1200 may be modified to combine fewer than 9 input streams, more than 9 input streams, 2-8 input streams, 9-20 input streams, 20-100 input streams, or any suitable number of serial input streams.

Still referring to FIG. 12A, parallel output Y provided at output path 1208, which is generated at each clock cycle, may be optionally accumulated using an accumulator circuit such as shift-right accumulator 1210. This configuration is therefore sometimes referred to as having a bit-serial input and a multistage parallel output since the parallel output bits Y are accumulated over multiple clock cycles. Shift-right accumulator 1210 may include an adder 1212, a register 1214, a right-shift circuit (SHR) 1216, and a multiplexing circuit 1218. In contrast to accumulator 1210' of FIG. 11, shift-right accumulator 1210 of FIG. 12A may further include cycle reduction logic having a cycle reduction subtraction circuit 1220-1 and a cycle reduction bit-width reduction circuit 1220-2. Note that the cycle reduction logic (which include circuits 1220-1 and 1220-2) is only needed if any one the inputs (e.g., An, Bn, Cn, etc.) are signed and is not needed for an unsigned adder tree.

Normally, adder 1212 will receive signal Y from the output of multiplexer 1218 (e.g., by setting select signal Sel low to pass through signals directly from input 1208). The output of adder 1212 is then latched using register 1214. The latched output is then fed back to a second input of adder 1212 after being right shifted by one bit position using shifter 1216.

In general, the examples relating to adder trees may be configured to combine any suitable number of serial input streams.

Figure 12B:
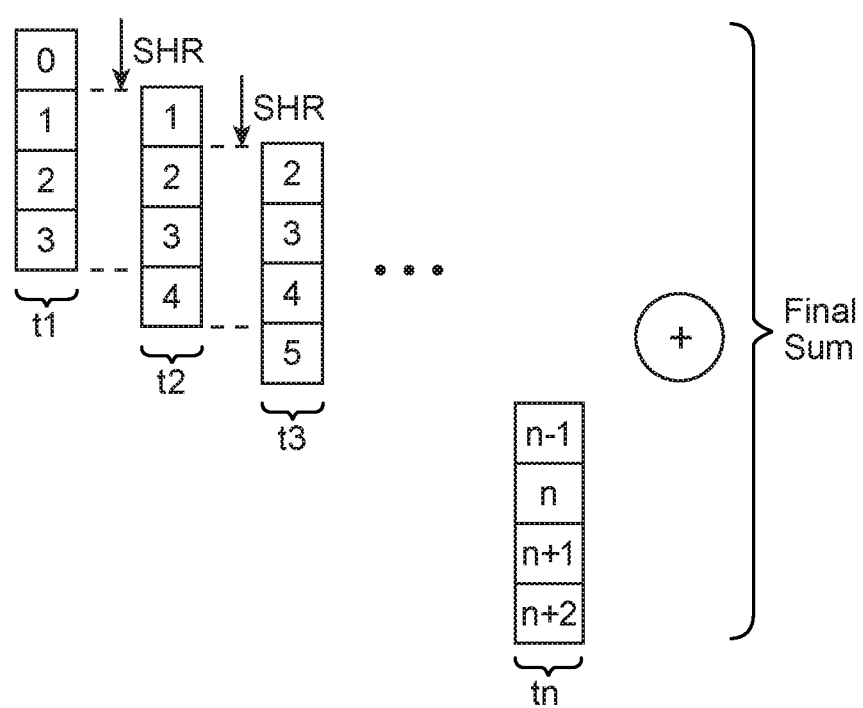
FIG. 12B is a diagram showing how the adder tree of FIG. 12A can produce parallel output bits that can be accumulated over time to generate a final sum in accordance with an embodiment.

FIG. 12B is a diagram showing how adder circuit 1200 accumulates the parallel output bits Y over time to generate a final sum value. During a first clock cycle t1, bits Y[3:0] will be generated. During a second clock cycle t2, bits Y[4:1] are effectively generated since all previous bits are right-shifted by one. During a third clock cycle t3, bits Y[5:2] are effectively generated since all previous bits are right-shifted by one. During an n-th clock cycle tn, bits Y[(n+2):(n−1)] are generated. Accumulator 1210 is configured to sum together all of these outputs to compute the final sum at output terminal 1222 (see FIG. 12A).

Shift-right accumulator 1210 may work as intended if inputs A-I are unsigned numbers. If, however, the inputs A-I are signed numbers, it is necessary to sign extend the output values. For signed numbers, the most significant bit (MSB) is the sign bit, where a sign bit value of "0" represents a positive number and where a sign bit value of "1" represents a negative number.

In general, when adding together two numbers, one extra bit is needed to encode the combined sum. As another example, when adding together four numbers, two extra bits are needed to encode the combined sum. As yet another example, when adding together eight numbers, three extra bits are needed to encode the combined sum. As yet another example, when adding together 16 numbers, four extra bits are needed to encode the combined sum. Thus, in the example of FIG. 12A in which 9 inputs are being added, the ceiling of $\log_2(9)$ or four extra bits are needed to encode the final sum. Without any additional logic, four extra clock cycles are needed to compute the four extra sign bits.

To avoid having to expend m extra clock cycles for the sign bits, where m is equal to the ceiling of $\log_2(i)$ as described above in connection with FIG. 11, cycle reduction logic 1220 may be activated for the last input sign bit (i.e., when adding together A[n−1], B[n−1], C[n−1], . . . , and I[n−1]) by asserting signal Sel high to configure multiplexer 1218 to route signals generated from circuit 1220-1 to its output.

Figure 13:
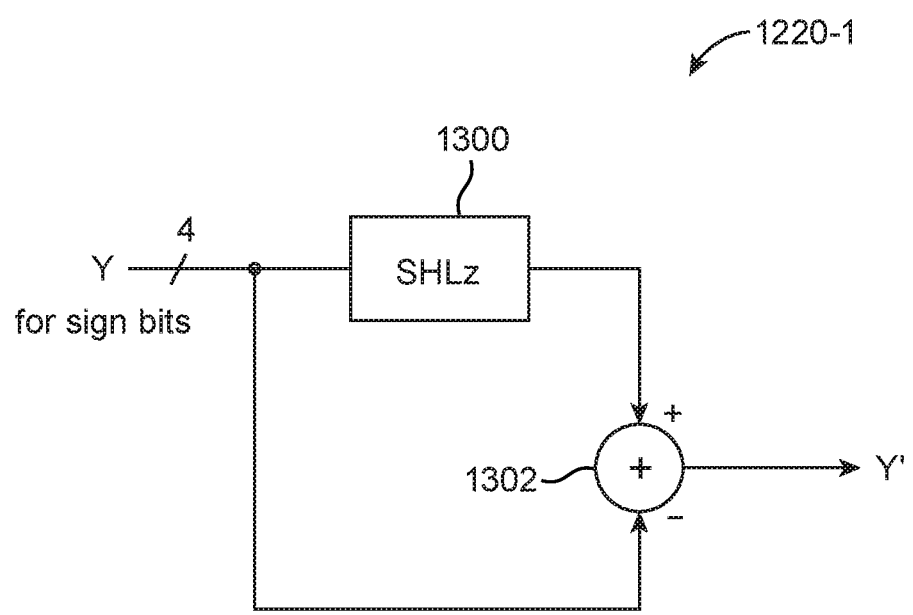
FIG. 13 is a diagram of an illustrative cycle reduction circuit that can be formed in an accumulator in accordance with an embodiment.

FIG. 13 is a diagram of illustrative cycle reduction subtraction circuit 1220-1. As shown in FIG. 13, cycle reduction circuit 1220 may include a left shifting (SHL) circuit 1330 and an adder 1302. In general, left shifting circuit 1330 may be configured to left shift received signals Y by the number of extra bits needed plus one. Here, the number of extra bits needed for adding together nine inputs is four, so shifter 1300 in the example of FIG. 13 will be configured to perform a left shift by 5 (i.e., 4+1).

Adder 1302 has a first (+) input that receives signal from shifter 1300 and a second (−) input that receives an unaltered signal Y. Configured in this way, adder 1302 will subtract Y from SHLz(Y), where z is equal to m+1. As described above, m is equal to the ceiling of $\log_2(i)$, where i represents the number of input terms to be combined by the adder tree. Computed in this way, m also represents the number of bits needed to encode parallel output Y. Here, z is equal to 5. Operated in this way, cycle reduction logic 1220 correctly generates a signed extended output Y' in a single clock cycle.

After Y' has been computed by cycle reduction subtraction circuit 1220-1, routed through multiplexer 1218, and accumulated by the shift right accumulator, one or more MSBs at the output of register 1214 can be truncated or dropped using cycle reduction bit-width reduction circuit 1220-2 to generate the final output at 1222. In general, the bit-width at the final output 1222 should be reduced to m+n, where m is equal to the ceiling of $\log_2(i)$, where i represents the number of input terms to be combined by the adder tree, and where n is the number of bits in each serial input stream. Thus, in an example where adder tree 1200 is used to sum together four different 3-bit numbers, the bit-width of the final output should be reduced to 5 (e.g., ceiling[$\log_2 4$]+3=5).

The shift-right accumulator 1210' of FIGS. 11 and 1210 of FIG. 12A should be initialized to zero before start of any addition operation.

EXAMPLES

The following examples pertain to further embodiments.

Example 1 is a circuit, comprising: common factor mass multiplication (CFMM) circuitry that multiplies a common factor by a plurality of multiplier values to generate a plurality of final products, the CFMM circuitry comprising: a common factor mass multiplication (CFMM) predetermined fixed constants multiplier circuit that effectively multiplies the common factor by predetermined fixed constants to generate corresponding common partial products, wherein the predetermined fixed constants represent a minimized set of constants for generating all binary values with up to j logic ones by only shifting the minimized set of constants left or right such that the common partial products is generated using a reduced number of add or subtract operations, wherein j is any integer greater than one, wherein the predetermined fixed constants also include a value with all ones, wherein the predetermined fixed constants are independent of the value of the common factor and the plurality of multiplier values, and wherein the generation of the common partial products is amortized across the generation of the plurality of final products; a selection and shifting circuit that receives the common partial products from the CFMM predetermined fixed constants multiplier circuit and that is controlled by the plurality of multiplier values; and an arithmetic circuit that receives signals from the selection and shifting circuit and that is controlled by the plurality of multiplier values to compute the plurality of final products, wherein at least one of the reduced number of add or subtraction operations and the arithmetic circuit is implemented using bit-serial adder circuits.

Example 2 is the circuit of example 1, wherein both the reduced number of add or subtraction operations and arithmetic circuit are optionally implemented using bit-serial adder circuits.

Example 3 is the circuit of any one of examples 1-2, wherein the minimized set of constants optionally exclude constants for generating binary values with k logic ones, and wherein k is greater than one but less than j.

Example 4 is the circuit of example 3, wherein the predetermined fixed constants optionally further include a value with all zeros wherein the common partial products corresponding to predetermined fixed constants with fewer than j logic ones are used to recursively generate additional common partial products corresponding to predetermined fixed constants with up to j logic ones.

Example 5 is the circuit of any one of examples 1-4, wherein at least one of the bit-serial adder circuits optionally has a first input configured to serially receive a first input stream and a second input configured to serially receive a second input stream.

Example 6 is the circuit of example 5, wherein at least one of the bit-serial adder circuits optionally has a register coupled in a feedback arrangement.

Example 7 is the circuit of example 5, wherein the CFMM circuitry optionally further comprises at least one register inserted at the second input of the at least one of the bit-serial adder circuits, and wherein the register effectively multiplies the second input stream by a power of two.

Example 8 is a circuit implementing a convolutional layer in a convolutional neural network, comprising: a set of common factor mass multiplication (CFMM) circuitries, wherein each CFMM circuitry in the set of CFMM circuitries receives an input feature map comprising a set of common factors, wherein each CFMM circuitry in the set of CFMM circuitries receives a plurality of weights corresponding to the input feature map as multiplier values for that CFMM circuitry, wherein each CFMM circuitry in the set of CFMM circuitries multiplies its set of common factors by its multiplier values to generate a set of terms in at least one output feature map; and an arithmetic circuit that accumulates at least one set of terms generated from each CFMM circuitry in the set of CFMM circuitries to generate a final value for the at least one output feature map, wherein the at least one set of terms are added together using a bit-serial adder tree.

Example 9 is the circuit of example 8, wherein the bit-serial adder tree optionally comprises a plurality of adders interconnected in a tree-like configuration, and wherein the bit-serial adder tree comprises at least one register inserted at an output of at least one of the plurality of adders.

Example 10 is the circuit of any one of examples 8-9, wherein the bit-serial adder tree optionally has bit-serial inputs and a bit-serial output.

Example 11 is the circuit of any one of examples 8-9, wherein the bit-serial adder tree optionally has bit-serial inputs and a parallel output.

Example 12 is the circuit of example 11, wherein the adder tree comprises a plurality of adder stages optionally having at least: a first stage of adders; and a second stage of adders configured to receive signals from the first stage of adders, wherein no registers are interposed between the first and second stage of adders.

Example 13 is the circuit of example 12, wherein the first stage of adders optionally comprises: a first adder configured to serially receive a first group of up to three multi-bit inputs; and a second adder configured to serially receive a second group of up to three multi-bit inputs.

Example 14 is the circuit of example 11, wherein the parallel output has a bit width that is optionally equal to or greater than the ceiling of $\log_2(i)$, and wherein i is equal to the total number of multi-bit inputs received by the bit-serial adder tree.

Example 15 is the circuit of any one of examples 8-14, optionally further comprising: a shift-right accumulator circuit configured to receive output signals from the bit-serial adder tree, wherein the shift-right accumulator circuit comprises: a register; a shift-right circuit that receives latched signals from the register; and a shift-right accumulator adder that adds a shifted value generated from the shift-right circuit to an output from the bit-serial adder tree to generate a corresponding sum that is stored into the register.

Example 16 is the circuit of example 15, wherein the shift-right accumulator optionally further comprises: cycle reduction logic configured to reduce the number of cycles needed to compute sign bits; and a multiplexer configured to select output signals from the cycle reduction logic instead of the output signals from the bit-serial adder tree when computing the sign bits.

Example 17 is the circuit of example 16, wherein the cycle reduction logic optionally comprises: a shift-left-by-z circuit, wherein z is equal to one plus the ceiling of $\log_2(i)$, wherein i is equal to the total number of multi-bit inputs received by the bit-serial adder tree, and wherein the shift-left-by-z circuit receives the output signals from the bit-serial adder tree and generates a corresponding shifted signal; a subtraction circuit that subtracts the shifted valued from the output signals from the bit-serial adder tree; and a bit-width reduction circuit that drops one or more most significant bits (MSBs) at an output of the shift-right accumulator.

Example 18 is a circuit, comprising: common factor mass multiplication (CFMM) circuitry configured to multiply a common factor by a plurality of multiplier values to generate a plurality of final products, the CFMM circuitry comprising: a CFMM predetermined fixed constants multiplier circuit that effectively multiplies the common factor by predetermined fixed constants to generate corresponding common partial products, wherein the predetermined fixed constants are independent of the value of the common factor and the plurality of multiplier values, and wherein the cost of generating the common partial products is amortized across the generation of the plurality of final products; and instance specific circuitry that combines at least some of the common partial products to generate the plurality of final products, wherein the arrangement of the instance specific circuitry is determined by the multiplier values, wherein computation circuits within the instance specific circuitry are shared to generate the plurality of final products, wherein selection and shifting circuits within the instance specific circuitry select and shift the common partial products before arriving at the computation circuits, and wherein the instance specific circuitry is fully enumerated to implement all possible unique multiplier values.

Example 19 is the circuit of example 18, wherein the computation circuits optionally comprise: addition and subtraction circuits configured to generate the plurality of final products.

Example 20 is the circuit of example 19, wherein the CFMM circuitry optionally further comprises shifting circuits coupled outputs of at least some of the addition and subtraction circuits.

Example 21 is the circuit of example 20, wherein the multiplier values each have n bits, and wherein the fully enumerated instance specific circuitry is optionally configured to generate $2^n$ final products.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A circuit, comprising:
    common factor mass multiplication (CFMM) circuitry that multiplies a common factor by a plurality of multiplier values to generate a plurality of final products, the CFMM circuitry comprising:
        a common factor mass multiplication (CFMM) predetermined fixed constants multiplier circuit that multiplies the common factor by predetermined fixed constants to generate corresponding common partial products, wherein the predetermined fixed constants represent a minimized set of constants for generating all binary values of the common partial products with up to j logic ones by only shifting the minimized set of constants left or right such that the common partial products is generated using a reduced number of add or subtract operations, wherein j is any integer greater than one, wherein the predetermined fixed constants also include a value with all ones, wherein the predetermined fixed constants are independent of the value of the common factor and the plurality of multiplier values, and wherein the generation of the common partial products is amortized across the generation of the plurality of final products;
        a selection and shifting circuit that receives the common partial products from the CFMM predetermined fixed constants multiplier circuit and that is controlled by the plurality of multiplier values; and
        an arithmetic circuit that receives signals from the selection and shifting circuit and that is controlled by the plurality of multiplier values to compute the plurality of final products, wherein at least one of (1) the arithmetic circuit and (2) the reduced number of add or subtraction operations is implemented using bit-serial adder circuits.

2. The circuit of claim 1, wherein both the reduced number of add or subtraction operations and arithmetic circuit are implemented using bit-serial adder circuits.

3. The circuit of claim 1, wherein the minimized set of constants exclude constants for generating binary values with k logic ones, and wherein k is greater than one but less than j.

4. The circuit of claim 3, wherein the predetermined fixed constants further include a value with all zeros wherein the common partial products corresponding to predetermined fixed constants with fewer than j logic ones are used to recursively generate additional common partial products corresponding to predetermined fixed constants with up to j logic ones.

5. The circuit of claim 1, wherein at least one of the bit-serial adder circuits has a first input configured to serially receive a first input stream and a second input configured to serially receive a second input stream.

6. The circuit of claim 5, wherein at least one of the bit-serial adder circuits has a register coupled in a feedback arrangement.

7. The circuit of claim 5, wherein the CFMM circuitry further comprises at least one register inserted at the second input of the at least one of the bit-serial adder circuits, and wherein the register effectively multiplies the second input stream by a power of two.

8. A circuit implementing a convolutional layer in a convolutional neural network, comprising:
    a set of common factor mass multiplication (CFMM) circuitries, wherein each CFMM circuitry in the set of CFMM circuitries receives an input feature map comprising a set of common factors, wherein each CFMM circuitry in the set of CFMM circuitries receives a plurality of weights corresponding to the input feature map as multiplier values for said each CFMM circuitry, wherein each CFMM circuitry in the set of CFMM circuitries multiplies the set of common factors by the multiplier values to generate a set of terms in at least one output feature map; and
    an arithmetic circuit that accumulates at least one set of terms generated from each CFMM circuitry in the set of CFMM circuitries to generate a final value for the at least one output feature map, wherein the at least one set of terms are added together using a bit-serial adder tree.

9. The circuit of claim 8, wherein the bit-serial adder tree comprises a plurality of adders interconnected in a tree-like configuration, and wherein the bit-serial adder tree comprises at least one register inserted at an output of at least one of the plurality of adders.

10. The circuit of claim 8, wherein the bit-serial adder tree has bit-serial inputs and a bit-serial output.

11. The circuit of claim 8, wherein the bit-serial adder tree has bit-serial inputs and a parallel output.

12. The circuit of claim 11, wherein the adder tree comprises a plurality of adder stages having at least:
    a first stage of adders; and
    a second stage of adders configured to receive signals from the first stage of adders, wherein no registers are interposed between the first and second stage of adders.

13. The circuit of claim 12, wherein the first stage of adders comprises:
 a first adder configured to serially receive a first group of up to three multi-bit inputs; and
 a second adder configured to serially receive a second group of up to three multi-bit inputs.

14. The circuit of claim 11,
 wherein the parallel output has a bit width that is equal to or greater than a ceiling of $\log_2(i)$, and wherein i is equal to a total number of multi-bit inputs received by the bit-serial adder tree.

15. The circuit of claim 8, further comprising:
 a shift-right accumulator circuit configured to receive output signals from the bit-serial adder tree, wherein the shift-right accumulator circuit comprises:
  a register;
  a shift-right circuit that receives latched signals from the register; and
  a shift-right accumulator adder that adds a shifted value generated from the shift-right circuit to an output from the bit-serial adder tree to generate a corresponding sum that is stored into the register.

16. The circuitry of claim 15, wherein the shift-right accumulator further comprises:
 cycle reduction logic configured to reduce a number of cycles needed to compute sign bits; and
 a multiplexer configured to select output signals from the cycle reduction logic instead of the output signals from the bit-serial adder tree when computing the sign bits.

17. The circuitry of claim 16, wherein the cycle reduction logic comprises:
 a shift-left-by-z circuit, wherein z is equal to one plus a ceiling of $\log_2(i)$, wherein i is equal to a total number of multi-bit inputs received by the bit-serial adder tree, and wherein the shift-left-by-z circuit receives the output signals from the bit-serial adder tree and generates a corresponding shifted signal;
 a subtraction circuit that subtracts the shifted valued from the output signals from the bit-serial adder tree; and
 a bit-width reduction circuit that drops one or more most significant bits (MSBs) at an output of the shift-right accumulator.

18. A circuit, comprising:
 common factor mass multiplication (CFMM) circuitry configured to multiply a common factor by a plurality of multiplier values to generate a plurality of final products, the CFMM circuitry comprising:
  a CFMM predetermined fixed constants multiplier circuit that multiplies the common factor by predetermined fixed constants to generate corresponding common partial products, wherein the predetermined fixed constants are independent of the value of the common factor and the plurality of multiplier values, and wherein the cost of generating the common partial products is amortized across the generation of the plurality of final products; and
  instance specific circuitry that combines at least some of the common partial products to generate the plurality of final products, wherein the arrangement of the instance specific circuitry is determined by the multiplier values, wherein computation circuits within the instance specific circuitry are shared to generate the plurality of final products, wherein selection and shifting circuits within the instance specific circuitry select and shift the common partial products before the common partial products arrive at the computation circuits, and wherein the instance specific circuitry is fully enumerated to implement all possible unique multiplier values.

19. The circuit of claim 18, wherein the computation circuits comprise:
 addition and subtraction circuits configured to generate the plurality of final products.

20. The circuit of claim 19, wherein the CFMM circuitry further comprises shifting circuits coupled to outputs of at least some of the addition and subtraction circuits.

21. The circuit of claim 20, wherein the multiplier values each have n bits, and wherein the fully enumerated instance specific circuitry is configured to generate $2^n$ final products.

* * * * *